US012264537B2

(12) United States Patent

Sundelin et al.

(10) Patent No.: US 12,264,537 B2
(45) Date of Patent: Apr. 1, 2025

(54) COVER ARRANGEMENT

(71) Applicant: BLINDSPACE AB, Kungsbacka (SE)

(72) Inventors: Anders Sundelin, Mölndal (SE); Gaius Henry Guest, Kungsbacka (SE)

(73) Assignee: BLINDSPACE AB, Kungsbacka (SE)

( * ) Notice: Subject to any disclaimer, the term of this patent is extended or adjusted under 35 U.S.C. 154(b) by 0 days.

(21) Appl. No.: 18/024,754

(22) PCT Filed: Oct. 20, 2021

(86) PCT No.: PCT/SE2021/051048
§ 371 (c)(1),
(2) Date: Mar. 4, 2023

(87) PCT Pub. No.: WO2022/093095
PCT Pub. Date: May 5, 2022

(65) Prior Publication Data

US 2023/0349229 A1 Nov. 2, 2023

(30) Foreign Application Priority Data

Oct. 26, 2020 (GB) ..................................... 2016937

(51) Int. Cl.
*E06B 9/42* (2006.01)
*E06B 9/17* (2006.01)
*E06B 9/323* (2006.01)

(52) U.S. Cl.
CPC ............ *E06B 9/42* (2013.01); *E06B 9/17007* (2013.01); *E06B 9/323* (2013.01)

(58) Field of Classification Search
CPC ........ E06B 9/42; E06B 9/17007; E06B 9/323; E06B 9/1703; E06B 9/17015; E06B 9/17023; E05D 15/0652; E05D 15/0621
See application file for complete search history.

(56) References Cited

U.S. PATENT DOCUMENTS

| | | | | |
|---|---|---|---|---|
| 3,473,266 A * | 10/1969 | Miller | E05D 15/0652 49/504 |
| 6,446,394 B1 * | 9/2002 | Finke | E05D 15/0652 49/404 |

(Continued)

FOREIGN PATENT DOCUMENTS

| | | |
|---|---|---|
| EP | 3091158 A1 | 11/2016 |
| EP | 3418486 A1 | 12/2018 |
| WO | 2019037834 A1 | 2/2019 |

OTHER PUBLICATIONS

International Search Report (Nov. 29, 2021) for corresponding International App. PCT/SE2021/051048.

*Primary Examiner* — Beth A Stephan
(74) *Attorney, Agent, or Firm* — WRB-IP PLLC

(57) ABSTRACT

A cover arrangement for at least partially covering an opening includes an elongated support member, which is adapted to be arranged adjacent the opening, a plate-shaped cover adapted to be connected to the elongated support member in a way that, in a connected state, the plate-shaped cover projects from the elongated support member, and at least one connection element. The connection element and the elongated support member include complimentary shaped first engagement means so that the connection element may be rigidly connected to the elongated support member in an operative state. Further, the connection element and the plate-shaped cover include complimentary shaped pivot means so that the plate-shaped cover may be pivoted between a non-connected state and the connected state in relation to the elongated support member when the connection element is in its operative state in relation to the elongated support member.

15 Claims, 28 Drawing Sheets

(56) References Cited

U.S. PATENT DOCUMENTS

| | | | | |
|---|---|---|---|---|
| 7,497,050 | B2 * | 3/2009 | Romero .................. | E05D 15/48 49/141 |
| 2006/0226103 | A1 | 10/2006 | Streib et al. | |
| 2016/0138316 | A1 | 5/2016 | Finke et al. | |
| 2018/0347248 | A1 | 12/2018 | McGregor et al. | |
| 2024/0301735 | A1 * | 9/2024 | Zimmer .............. | E05D 15/0621 |

* cited by examiner

COVER ARRANGEMENT

BACKGROUND AND SUMMARY

The invention relates to a cover arrangement for at least partially covering an opening, primarily an elongated opening.

The cover arrangement comprises an elongated support member, which is adapted to be arranged adjacent the opening and may define the opening. The cover arrangement further comprises a plate-shaped cover adapted to be connected to the elongated support member in a way that, in a connected state, the plate-shaped cover projects from the elongated support member so that the cover at least partially covers the opening.

The elongated support member may be formed by a profile defining a channel with a main extension direction in a longitudinal direction of the elongated support member, wherein the channel is open in one direction transverse of the longitudinal direction and wherein the plate-shaped cover is arranged to extend in a direction between opposite walls defining the channel in the connected state. More specifically, the elongated support member may be U-shaped in cross section, wherein the elongated opening is defined by the walls of the U-shaped elongated support member.

The elongated support member may be adapted for being mounted in or at a wall or roof in a structure, such as a building. According to one example application, the elongated support member may be arranged for supporting at least a part of an extendable or movable covering, such as a blind or screen. Such a covering may be arranged for movement between a retracted state and an extended state for at least partly covering a window. Window coverings are used to cover a window to, for example, manage sunlight, to provide insulation, blackout, to ensure privacy or security, to keep insects out or for purely decorative purposes. Window coverings are usually on the interior side of windows, but exterior solutions are also available. Window coverings may also be referred to as window furnishings or window blinds. The elongated support member may be adapted to be attached to a section of the wall or roof defining the window frame.

One common type of covering comprises a sheet of material wound up on a roll, wherein the sheet of material may be extended from the roll by a rotation of the roll.

More specifically, the elongated support member may be arranged for housing the covering in a retracted or rolled up state. The plate-shaped cover may be arranged in a way that the cover projects from the support member so that it at least partly conceals the space for the covering. According to one alternative, the elongated support member may be arranged for concealing and/or guiding the lateral edges of the movable covering during movement of the covering.

WO2019/037834 discloses an arrangement comprising three elongated support members, wherein each one is formed by a profile with a U-shaped cross section. A first one of the elongated support members is adapted for housing the roller for the covering and the other two elongated support members are arranged in parallel with each other in a spaced relationship and perpendicularly in relation to the first elongated support member, wherein they form sideways supports for guiding the lateral side edges of the movable covering during movement of the covering. More specifically, each one of the two parallel elongated support members may be adapted for accommodating a guide, which is adapted for guiding the lateral side edge of the covering during movement of the covering. The guide may alternatively be called a rail or track.

Further, in WO2019/037834, each one of the elongated support members are arranged recessed in a wall portion defining a window so that the associated plate-shaped cover is flush with the wall surface when connected to the elongated support member. Further, each one of the elongated support member and the cover are provided with complimentary shaped pivot means for forming a pivot axis so that the plate-shaped cover may be pivoted between a non-connected state and the connected state in relation to the elongated support member.

In some applications, the arrangement according to WO2019/037834 may have issues with regard to tolerances when extruding long and large aluminium profiles, which may lead to problems such as that the covers tend to get stuck and require a lot of force to open.

It is desirable to provide a cover arrangement, which creates conditions for a facilitated assembly and disassembly of a plate shaped cover in relation to an associated elongated support member.

According to an aspect of the invention, a cover arrangement is provided comprising an elongated support member, which is adapted to be arranged adjacent the opening, a plate-shaped cover adapted to be connected to the elongated support member in a way that, in a connected state, the plate-shaped cover projects from the elongated support member, and at least one connection element, wherein the connection element and the elongated support member comprises complimentary shaped first engagement means so that the connection element may be rigidly connected to the elongated support member in an operative state, and wherein the connection element and the plate-shaped cover comprises complimentary shaped pivot means so that the plate-shaped cover may be pivoted between a non-connected state and the connected state in relation to the elongated support member when the connection element is in its operative state in relation to the elongated support member.

This design has advantages such as that it is easy to install, open and close the plate-shaped cover. Further, the firmness of the plate-shaped cover in the connected state can be adjusted with more or fewer connection elements. Further, there is less requirements on tolerances of the elongated support member and the plate-shaped cover, wherein there is less risk of tolerance error in manufacturing. Further, there is no risk that the pivot/hinge is damaged during installation of the elongated support member in a wall. Further, there will be more room when installing blinds since there is no projecting pivot/hinge reducing the opening size.

Further, the design is more flexible in case of a U-shaped elongated support member in that it creates conditions to select the blind orientation within the support member depending on if a user wants the blind towards the window or towards the room. It is achieved in that both legs of the U-shaped profiles are provided with the engagement means at an interior surface, wherein the connection elements are engaged with the leg associated to the desired blind orientation. It follows that a user may also change orientation of the blind with 180 degrees after installation by moving the connection elements to the other leg of the elongated support member.

According to one example, the elongated support member is formed by a profile with the same cross section shape in the longitudinal direction of the elongated support member. According to one example, the elongated support member may have a U-shaped cross section shape. More specifically, the elongated support member may comprise a back plate and two spaced side plates arranged in parallel with each other and extending perpendicularly in relation to the back plate so that the support member has a shape defining an elongated aperture extending in parallel with the longitudinal direction of the elongated support member. Preferably, each one of the plates has a rectangular shape. Each one of the plates may be elongated with a longitudinal direction in parallel with a longitudinal direction of the elongated support member. According to a further example, the plates are of the same length and are formed in a one-piece unit. In other words, the elongated support member may form a profile with constant cross section along its extension direction. Such a design of the elongated support member is especially suitable for mounting in a groove in the wall or roof for a so-called recessed configuration, wherein an exterior surface of the plate-shaped cover may be flush with the adjacent wall surfaces. Preferably, the groove has a rectangular cross section shape with a bottom surface and two opposite side surfaces and size corresponding to the exterior shape and size of the elongated support member. The elongated support member may be secured to the wall portion via fasteners extending through the back plate.

At least one of the spaced side plates will then comprise the first engagement means, preferably at a long side edge of the support member. According to one example, both spaced side plates comprises the engagement means in a mirrored configuration.

According to one example, the plate-shaped cover is elongated and has a main portion that is plate-shaped. The plate-shaped portion is rectangular and has a main extension direction in parallel with a longitudinal direction of the elongated cover and a secondary extension direction perpendicular to the longitudinal direction. According to a further example, the plate-shaped cover has an extension in the longitudinal direction at least substantially commensurate with a length of the elongated support member in its longitudinal direction. According to one example, the elongated cover is formed by a profile with the same cross section shape in the longitudinal direction of the elongated plate-shaped cover.

Further, according to one example, an extension of the elongated plate-shaped cover in a direction perpendicular to its longitudinal direction is substantially commensurate with a transverse extension of the opening so that the cover completely closes the opening. In the case of a U-shaped elongated support member, an extension of the elongated plate-shaped cover in a direction perpendicular to its longitudinal direction is substantially commensurate with an extension of the elongated support member in a direction perpendicular to its longitudinal direction so that the cover completely closes the distance between opposite walls of the U-shaped elongated support member.

The cover arrangement creates conditions for an architect or a designer during planning a construction or building comprising a window to at least temporarily conceal the support member and any other structures, such as a covering roller and associated holders and guides for the covering or the locations of such operative structures during installation. Further, the cover arrangement creates conditions for postponing selection of one of a plurality of available covering solutions, such as the number of coverings and the types of coverings. Further, an elongated support member may be built in a wall in a recessed way adjacent a window at the time of construction of a building or subsequently as a retrofit.

According to an alternative to the last-mentioned example, an extension of the elongated plate-shaped cover in a direction perpendicular to its longitudinal direction is somewhat smaller than a transverse extension of the opening so that a gap/slot is formed between an edge of the cover and an adjacent surface defining the opening. In the case of a U-shaped elongated support member, an extension of the elongated plate-shaped cover in a direction perpendicular to its longitudinal direction is somewhat smaller than an extension of the elongated support member in a direction perpendicular to its longitudinal direction so that the gap/slot is formed between an edge of the cover and an adjacent wall of the U-shaped elongated support member. The plate-shaped cover according to the last-mentioned example may be removed and replaced by the plate-shaped cover according to this example when the cover arrangement is adapted for being used for a covering.

According to one example, the plate-shaped portion of the cover has an interior side for facing the opening (an interior space defined by the elongated support member) and an exterior side opposite the interior side, wherein the pivot means is arranged at an edge of the plate shaped portion between the interior side and the exterior side. According to one example, the plate shaped portion forms the main part of the cover and the exterior side of the plate shaped portion forms substantially the only part of the cover visible from the outside when the cover is in the connected state relative to the support member.

According to a further example, the pivot means of the cover is arranged on the interior side of the plate shaped portion. This example creates further conditions for an aesthetically attractive solution in that the pivot means will not be visible when the cover is in the connected state relative to the elongated support member.

Further, according to one example, in the connected state, the plate-shaped cover is in physical contact with the elongated support member when it projects from the elongated support member.

The at least one connection element forms an intermediate body between the elongated support member and the plate-shaped cover. It creates conditions for connecting the plate-shaped cover to the elongated support member via the connection element. Thus, it creates further opportunities for designing the engagement means and pivot means between the plate-shaped cover and the elongated support member. For example, the connection element may be formed in a different material than the material of the elongated support member and the plate-shaped member, respectively, wherein the material of the connection element may be selected specifically for the functioning of the engagement means and the pivot means. According to one example, the cover arrangement is adapted so that the at least one connection element forms the only connection between the elongated support member and the plate-shaped cover.

Further, the cover arrangement may be designed so that a length of the at least one connection element in a longitudinal direction of the elongated support member is substantially smaller than a length of the elongated support member. Thus, the engagement means and the pivot means, respectively, may have a length in the longitudinal direction of the elongated support member that is substantially smaller than a length of the elongated support member. It creates conditions for more options in that a number of the connection element(s) and/or a design of the connection element(s) may be selected for a specific application. Further, it creates conditions for a facilitated mounting and demounting of the plate-shaped cover in that there is a reduced risk of the plate-shaped cover being stuck to the elongated support member. Further, it creates conditions for more cost-effective solutions in that each part may be designed for its specific purpose.

The cover arrangement may be adapted for operation of a covering in the form of a blind or screen. Such a covering may be adapted to be extendable between a retracted position and an extended position, preferably in parallel with a plane. Further, the covering may be designed so that the boundaries of the covering define a rectangular shape in the extended state. The covering may further be continuous, like a blind or screen, or discontinuous, like a plurality of interconnected and spaced parallel vane members. Further, the covering may be rolled onto a roll. In the case the covering is discontinuous, the vane members may be interconnected via cords and assume a packed condition with decreased internal spacing in the retracted state.

According to one example, the cover arrangement comprises an elongated support member, which is adapted for housing the covering in the rolled up or packed state. In the case that the covering is formed by a blind/screen rolled onto a roller, the roller is arranged so that its rotation axis is in parallel with the longitudinal direction of the elongated support member. When an elongated plate-shaped cover with a smaller extension in a transverse direction than a transverse extension of the opening is connected to the elongated support member, a gap/slot is formed adjacent the longitudinal edge of the elongated plate-shaped cover. The blind/screen may then be rolled out/in via the gap/slot. In this way, the plate-shaped cover conceals the roller and any mounting means for mounting the roller, which creates conditions for an aesthetically attractive solution.

According to one example, which may be a further development of the last-mentioned example, the cover arrangement comprises an elongated support member, which is adapted for receiving and possibly guiding a lateral edge of the blind/screen during rolling out/in of the blind/screen. When an elongated plate-shaped cover with a smaller extension in a transverse direction than a transverse extension of the opening is connected to the elongated support member, a gap is formed adjacent the longitudinal edge of the elongated plate-shaped cover. The elongated support member and the blind/screen may be arranged in such a way relative to one another that the lateral edge of the blind/screen is received in the gap during rolling out/in of the blind/screen. In this way, the plate-shaped member conceals the lateral edge of the blind/screen and any rail/guide arranged in the opening for guiding the lateral edge of the blind/screen, which creates conditions for an aesthetically attractive solution.

According to a further embodiment example, the cover arrangement comprises at least two elongated support members and wherein they are arranged perpendicularly in relation to each other. According to one example, the cover arrangement comprises two elongated support members arranged perpendicularly in relation to each other and preferably connected to each other. A first one of the support members may house the covering and the other support member may form a sideways support of a lateral edge of the covering.

According to another example, the cover arrangement comprises two elongated support members arranged in parallel with each other. One of the two parallel elongated support members may house the covering, wherein the opposite one may be arranged on an opposite side of the a space to be covered and may comprise a roll or other counterpart for cords forming loops for guiding the covering. According to an alternative, the two parallel elongated support, members are arranged on opposite sides of the space in a sideways direction, wherein each one of them may form a sideways support of a lateral edge of the covering.

According to another example, the cover arrangement comprises three elongated support members, wherein a first one of the support members may house the covering and the other two may be arranged in parallel with each other in a spaced relationship thereby forming sideways supports of opposite side edges of the covering.

According to another example, the cover arrangement comprises four elongated support members, wherein a first pair of the support members are arranged in spaced parallel relationship and a second pair of the support members are arranged in spaced parallel relationship perpendicular to the first pair. Thus, the cover arrangement may form a frame around a window. A first one of the support members of the first pair may house the covering and the opposite support member may comprise a roll or other counterpart for cords forming loops for guiding the covering. The second pair of support members may form sideways supports of opposite lateral edges of the covering.

Another type of covering is formed by a curtain, wherein the curtain may be slidably arranged in a track. Accordingly, the elongated support member may be arranged to house a recessed curtain track above a window opening. The curtain may be provided with spaced sliders along a top side, wherein the sliders engage the track and the curtain is movable in a sideways direction of the window.

Further, the elongated support member may have an extension in its longitudinal direction designed for at least as long as a height/width extension of an associated window.

Further, the elongated support member may have a longitudinal extension along a straight line and be substantially rigid. Further, the elongated support member may be formed in a one-piece unit. Further, the elongated support member may be formed in a metallic material such as aluminium and be produced via extrusion.

Further, the elongated support member may be adapted to be attached to the wall portion or roof portion in a fixed state via one or several connection means, like screws or rivets or glue.

Further, the elongated plate-shaped cover may have a longitudinal extension along a straight line and be substantially rigid. Further, the plate-shaped cover may be formed in a one-piece unit. Further, the plate-shaped cover may be formed in a metallic material such as aluminium and be produced via extrusion.

Further, the connection element may have an extension in one direction along a straight line and be somewhat flexible. Further, the connection element may be formed in a one-piece unit. Further, the connection elements may be formed in a non-metal material, such as a plastic material. The connection elements may be produced via extrusion followed by cutting to desired lengths or via 3D printing. The term "plastics" comprises a wide range of synthetic or semi-synthetic organic compounds that are malleable and so can be moulded into solid objects. Thus, the plastic material can deform irreversibly without breaking. According to one example, the connection elements may be formed in a plant based polymer.

The pivot design creates conditions for a facilitated disassembly of the plate-shaped cover in that an operator may grab a long side edge of the cover opposite the pivot means and pivot the cover around the pivot axis until the cover is released from the connection element (and the elongated support member) and then remove the cover. In a similar fashion, in an assembly operation, the operator may grab the long side edge of the plate-shaped cover opposite the corresponding pivot means of the cover, match the cover relative to the pivot means and pivot the cover around the pivot axis until the cover is connected to the support member via the connection element. In the case that a plate-shaped cover is connected to the elongated support member in a way that it completely covers the opening, a tool, such as a screw driver, may be inserted between the cover and the elongated member to separate the cover from the elongated support member.

According to one example, the first engagement means of the connection element and the elongated support member, respectively, may form a rounded surface (convex and concave, respectively) in a cross section perpendicular to the longitudinal direction of the connection element and the elongated support member, respectively.

According to a further example, the first engagement means may form a continuous structure in parallel with the longitudinal direction of the connection element and the elongated support member, respectively, and along a substantial portion of the length of the connection element and the elongated support member, respectively, preferably spanning the complete length of the connection element and the elongated support member, respectively.

According to a further example, the pivot means of the connection element and the plate-shaped cover, respectively, is arranged so that the pivot axis is in parallel with the longitudinal direction of the connection element and the plate-shaped cover, respectively.

According to a further example, the pivot means may form a continuous structure in parallel with the longitudinal direction of the connection element and the plate-shaped cover, respectively, and along a substantial portion of the length of the connection element and the plate-shaped cover, respectively, preferably spanning the complete length of the connection element and the plate-shaped cover, respectively.

According to a further example, the elongated support member has a plate-shaped portion with an interior side for facing the opening and an exterior side opposite the interior side adapted for facing a surface of the wall portion or roof portion and wherein the first engagement means is arranged in the vicinity of an edge of the plate-shaped portion between the interior side and the exterior side and at a distance from the edge. According to one example, the first engagement means is formed in one-piece with the plate-shaped portion.

According to a further example, the plate-shaped cover is arranged in a way that a main extension plane of the cover is perpendicular in relation to a main plane of the plate-shaped portion of the elongated support member in the connected state.

According to a further example, the cover arrangement is adapted so that the surface of the edge of the plate-shaped portion of the elongated support member and an outward facing surface of the plate-shaped cover are substantially flush when the cover is in the connected state. This embodiment example creates further conditions for an aesthetically attractive solution. Preferably, the cover arrangement is adapted so that a long side edge of the plate-shaped cover, which is adjacent the pivot means, and the adjacent surface of the elongated support member are positioned in contact or at least closely adjacent each other.

According to one embodiment, the plate-shaped cover and the elongated support member comprises complimentary shaped second engagement means for fixing the plate-shaped cover in the connected state in relation to the elongated support member. According to one example, a mounting procedure would be to in a first step rigidly attach the elongated support member to the wall, in a second step engage the at least one connection element to the elongated support member, in a third step position the plate-shaped cover so that the pivot means are in engagement and then pivot the plate-shaped cover until the second engagement means engage each other.

According to one example, the second engagement means of the support member projects in a direction perpendicular to the longitudinal direction of the elongated support member. Further, the second engagement means may define an elongated shape in parallel with the longitudinal direction of the elongated support member. According to one example, the second engagement means forms a continuous structure in parallel with the longitudinal direction of the elongated support member and the elongated plate-shaped cover, respectively, and along a substantial portion of the length of the elongated support member and the elongated plate-shaped cover, respectively, preferably spanning the complete length of the connection element and the elongated support member, respectively. According to one example, the second engagement means is formed in one-piece with the plate-shaped portion of the elongated support member and the elongated plate-shaped cover, respectively.

According to one example, the second engagement means is arranged in the vicinity of the edge of the plate-shaped portion of the elongated support member between the interior side and the exterior side. More specifically, the second engagement means is arranged closer to the edge than the first engagement means.

According to a further example, the second engagement means comprises an engagement surface in the vicinity of the edge of the plate-shaped portion of the elongated support member.

According to a further embodiment, the support arrangement comprises a plurality of connection elements, which are adapted to be connected to the elongated support member in a spaced relationship in the longitudinal direction of the elongated support member. In this way, the firmness of the plate-shaped cover in the connected state can be adjusted with more or fewer connection elements.

According to one example, a total extension of the plurality of connection elements is substantially smaller than a length of the elongated support member in its longitudinal direction. According to one example, a total extension of the plurality of connection elements is smaller than one fifth and preferably smaller than one tenth of a length of the elongated support member in its longitudinal direction. According to one example, an extension of a single connection element is substantially smaller than a spacing between two adjacent connection elements in the longitudinal direction of the elongated support member.

According to a further embodiment, at least one of the complimentary shaped first engagement means comprises an elastic portion adapted for being elastically displaced during engagement and disengagement. Preferably, the connection element comprises the elastic portion and the elongated support member comprises a complimentary shaped rigid portion. In other words, the first engagement means is adapted to form a click connection for an easy attachment and release of the connection element. More specifically, at least one of the first engagement means of the connection element and the support member may comprise a projection adapted to be elastic in a transverse direction for, during connection, allowing displacement for holding the other part. For example, the connection element may comprise two spaced elastic projections, which are adapted to receive a rigid part between them, which rigid part has a larger extension in a transverse direction than a distance between the two flexible projections. The two flexible projections would then displace somewhat in opposite directions during engagement, wherein the rigid part is firmly held.

According to one example, the complimentary shaped first engagement means is adapted so that the connection element may slide along the elongated support member when the complimentary shaped engagement means are in an engaged state. This is beneficial in a mounting scenario in that the connection element may first be attached to the elongated support member and then moved along the elongated support member to a desired position. An operator may then add or remove connection elements and accordingly move connection elements along the elongated support member for an optimum solution with regard to firmness of the cover in the connected state.

According to a further embodiment example, the connection element is arranged so that the pivot means is positioned at a distance from an adjacent surface of the elongated support member when the connection element is in its operative state in relation to the elongated support member so that the pivot means of the elongated cover may enter into engagement with the pivot means of the connection element via the space between the pivot means of the connection element and the adjacent surface of the elongated support member.

According to one example, the pivot means of the connection element faces the adjacent surface of the elongated support member when the connection element is in its operative state.

According to a further embodiment example, the complimentary shaped pivot means of the connection element and the elongated cover are adapted so that the elongated cover may hang on the connection element in the non-connected state when the connection element is in the operative state in relation to the elongated support member and the pivot means are in engagement. This is advantageous in the mounting in that the plate-shaped cover can be first hooked on to the connection element and then in a second step pivoted to its connection state.

According to a further embodiment example, the pivot means of the connection element is adapted so that the plate-shaped cover is obstructed from falling from the elongated support member in case of an unintentional displacement of the plate-shaped cover from its connected state when the connection element is in the operative state in relation to the elongated support member. This is advantageous in that the plate-shaped cover will not fall from the elongated support member in case the plate-shaped cover is subjected to a force from below, which undesirably releases it from its engagement. More specifically, the cover will be prevented from falling from the elongated support member irrespective of in which direction it is installed due to the hooking feature. Thus, it provides a security function, which is especially relevant for applications with covers of considerable length, such as when the elongated plate-shaped cover has a length of several meters.

According to a further embodiment example, the pivot means of the connection element comprises a hook-shaped portion, which is adapted to form a pivot axis for the plate-shaped cover.

According to a further embodiment example, the connection element comprises a projection which has a curved shape defining a receptacle for an edge section of the plate-shaped cover during connection and disconnection, wherein the receptacle is defined by the projection in one direction and by the plate shaped portion of the elongated support member in the other direction, wherein the receptacle is open for receiving the edge section of the plate-shaped cover during connection and disconnection and wherein the projection comprises the hook-shaped portion at the free end, wherein the hook-shaped portion extends into the receptacle.

Preferably, the pivot means of the plate-shaped cover also has the shape of a hook in cross section and is adapted for engagement with the hook of the elongated support member. Such a design creates conditions for a facilitated assembly and disassembly.

According to an alternative to the example described above wherein a single plate-shaped cover is connected to the elongated support member, a plurality of covers are arranged on the same support member. According to one example, the plurality of covers may be arranged in a side-by-side relationship in the longitudinal direction of the elongated support member.

According to a further example, the pivot means of the plate-shaped cover is positioned at a distance from a long side edge of the plate-shaped cover for engaging the pivot means of the support member.

According to one example, the material of the connection element is selected so that the elasticity pushes the plate-shaped cover towards the elongated support member when the plate-shaped cover is arranged the connected state in relation to the elongated support member.

It is also desirable to provide a connection element, which creates conditions for a facilitated assembly and disassembly of a plate shaped cover in relation to an associated elongated support member.

According to an aspect of the invention, a connection element is provided comprising a first engagement means for engagement with a complimentary shaped first engagement means of the elongated support member in a way that the connection element may be rigidly connected to the elongated support member in an operative state and a pivot means defining a pivot axis for the plate-shaped cover so that the plate-shaped cover, via a complimentary shaped pivot means, may be pivoted between a non-connected state and a connected state in relation to the elongated support member when the connection element is in its operative state in relation to the elongated support member.

According to one embodiment, the first engagement means comprises an elastic portion adapted for being elastically displaced during engagement and disengagement of the connection element in relation to the elongated support member.

According to a further embodiment, the pivot means of the connection element comprises a hook-shaped portion, which is adapted to form a pivot axis for the plate-shaped cover.

According to a further embodiment, a concave surface of the hook-shaped portion faces in the same direction as the first engagement means. The term “concave surface” is here referred to an inner surface of the hook-shaped portion for receipt of a correspondingly shaped hook-shaped portion of the plate-shaped cover. Thus, the definition means that the concave surface would face an inner surface of the elongated support member when the plate-shaped cover is in an operative state.

According to a further embodiment, the connection element comprises a positioning portion adapted for engaging a complimentary shaped portion of the elongated support member for positioning the connection element relative to the elongated support member during engagement of the first engagement means.

According to a further embodiment, the connection element is formed by a profile. One meaning of the term "profile" is that the connection element has a constant cross section along its length.

According to a further embodiment, the connection element is a one-piece unit.

According to a further embodiment, the connection element is formed in a plastic material.

According to a further embodiment, the connection element has an extension in an extension direction in the interval of 10-50 mm, which extension direction is adapted for being in parallel with the longitudinal direction of the elongated support member when the connection element is in its operative state.

According to one example, the elongated plate-shaped cover is pivoted towards its operative position relative to the elongated support member via pivot means arranged adjacent one longitudinal edge of the elongated plate-shaped cover. Further, the elongated plate-shaped cover comprises engagement means for engagement with the elongated support member in the vicinity of the longitudinal edge of the elongated plate-shaped cover being provided with the pivot means, wherein the elongated plate-shaped cover is not supported or connected to the elongated support member on the opposite longitudinal edge.

Regarding different applications, the elongated support member may be installed in window application, wherein the hook of the pivot means will project upwards. However the cover arrangement may also be used in skylights and gable end windows with the hook extending in all sorts of directions. Independent of the direction of the box when installed, the elongated plate-shaped cover will not slip out once opened. The elongated support member can be arranged up-side-down or side-ways, wherein the elongated plate-shaped cover will be hanging from above or standing up from below, while it will still be securely arranged via the book.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings.

DETAILED DESCRIPTION

Figure 1:
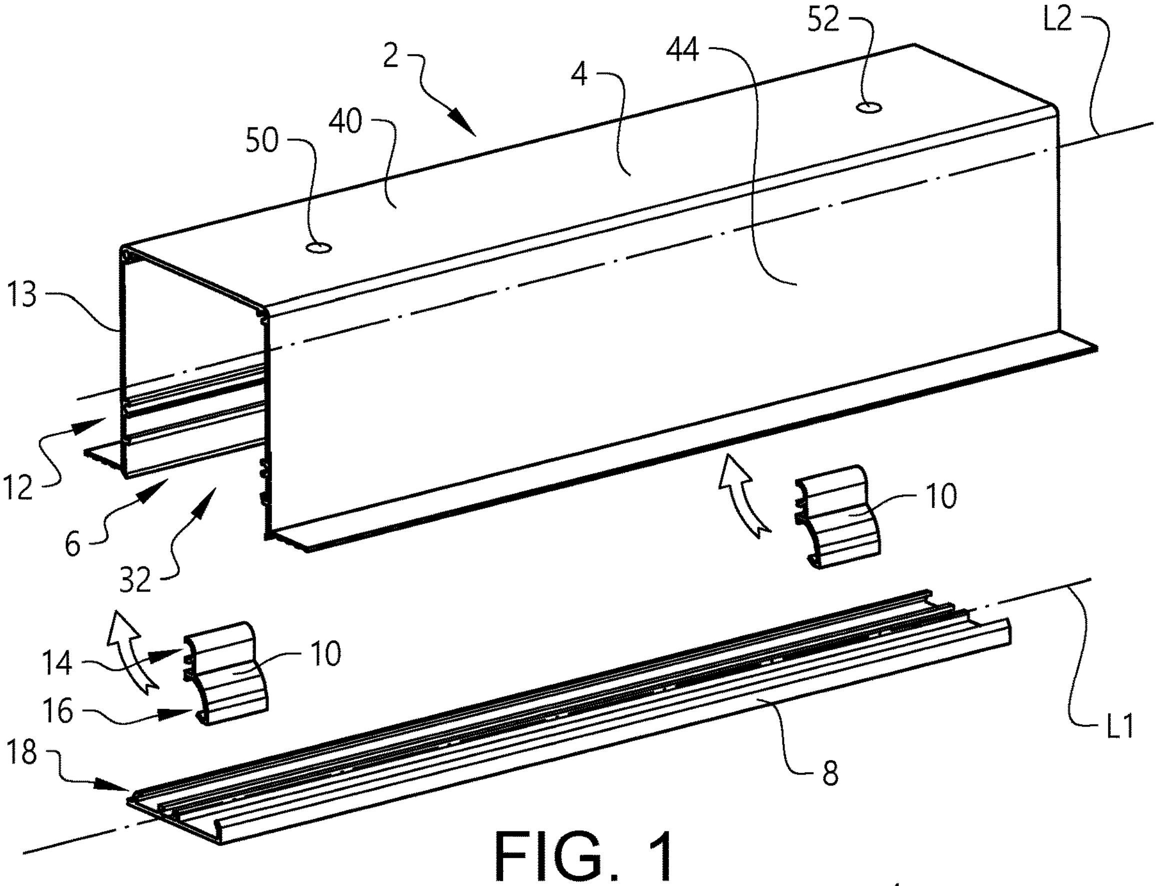
FIG. 1 is a perspective exploded view from the top of a cover arrangement according to a first embodiment.
Figure 5:
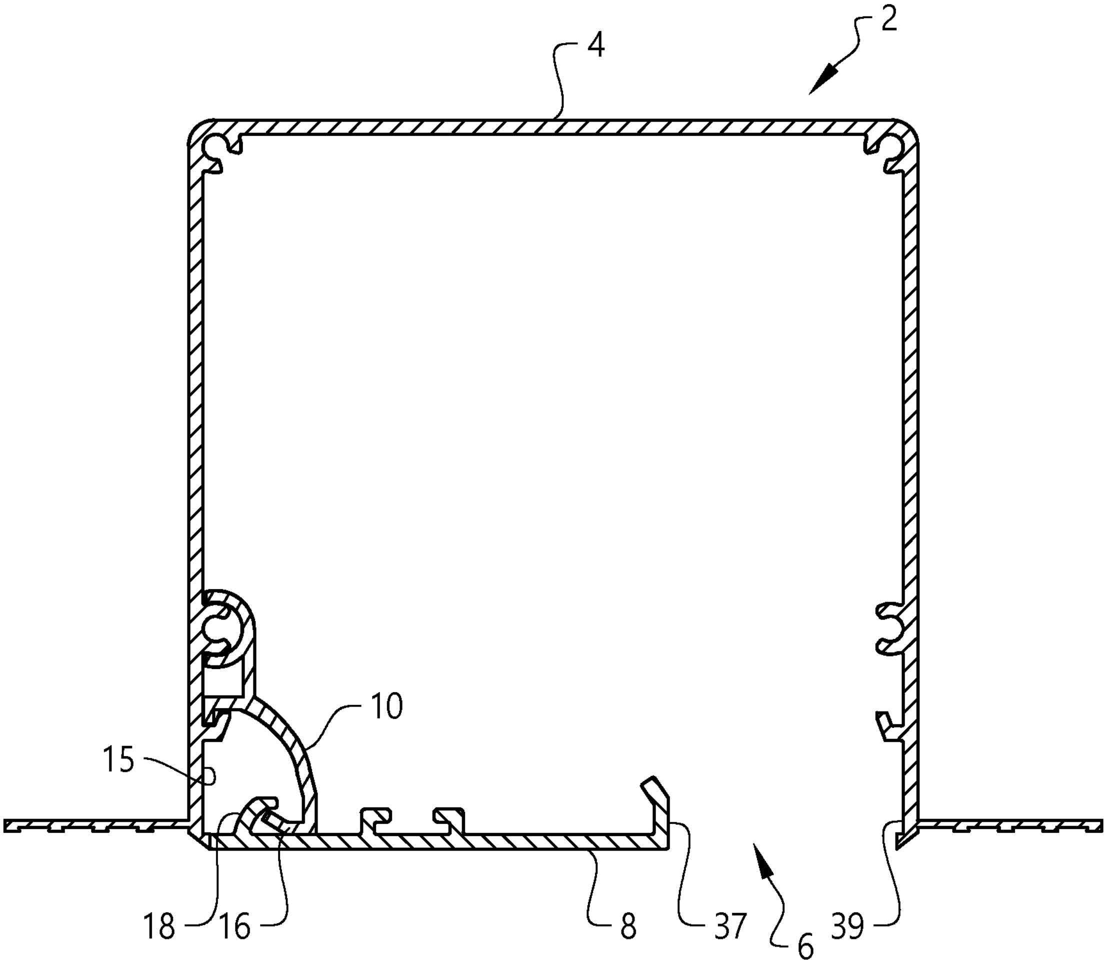
FIG. 5 is a cross section of cover arrangement in FIG. 1.

FIG. 1 shows a cover arrangement 2 for mounting in a wall or roof for housing at least one extendable covering (see FIG. 15) according to a first embodiment in an exploded view. FIG. 5 shows the cover arrangement 2 in FIG. 1 in a connected state in cross section. The covering may be arranged for movement between a retracted state and an extended state for at least partly covering for example a window in the wall or roof. The cover arrangement 2 comprises an elongated support member 4 adapted to be attached to a wall portion or roof portion defining the window. More specifically, the elongated support member 4 is adapted for accommodating at least one extendable covering in the retracted state.

The cover arrangement 2 is adapted for at least partially covering an opening 6 and comprises a plate-shaped cover 8 adapted to be connected to the elongated support member 4 in a way that, in a connected state, the plate-shaped cover projects from the elongated support member 4 so that the plate-shaped cover 8 partially covers the opening 6. In this way, the plate-shaped cover 8 at least partly conceals the space for the covering. Further, the plate-shaped cover 8 may be arranged for at least substantially concealing the elongated support member 4 when it is installed in a groove in the wall or roof. The elongated support member 4 is adapted to be arranged adjacent the opening 6. More specifically, the elongated support member 4 defines the opening 6.

The plate-shaped cover 8 is elongated and adapted for connection to the elongated support member 4 in a way that a longitudinal direction L1 of the plate-shaped cover 8 is in parallel with a longitudinal direction L2 of the elongated support member 4 in the connected state. Further, the elongated plate-shaped cover 10 is devoid of any slot for the covering.

Figure 2:
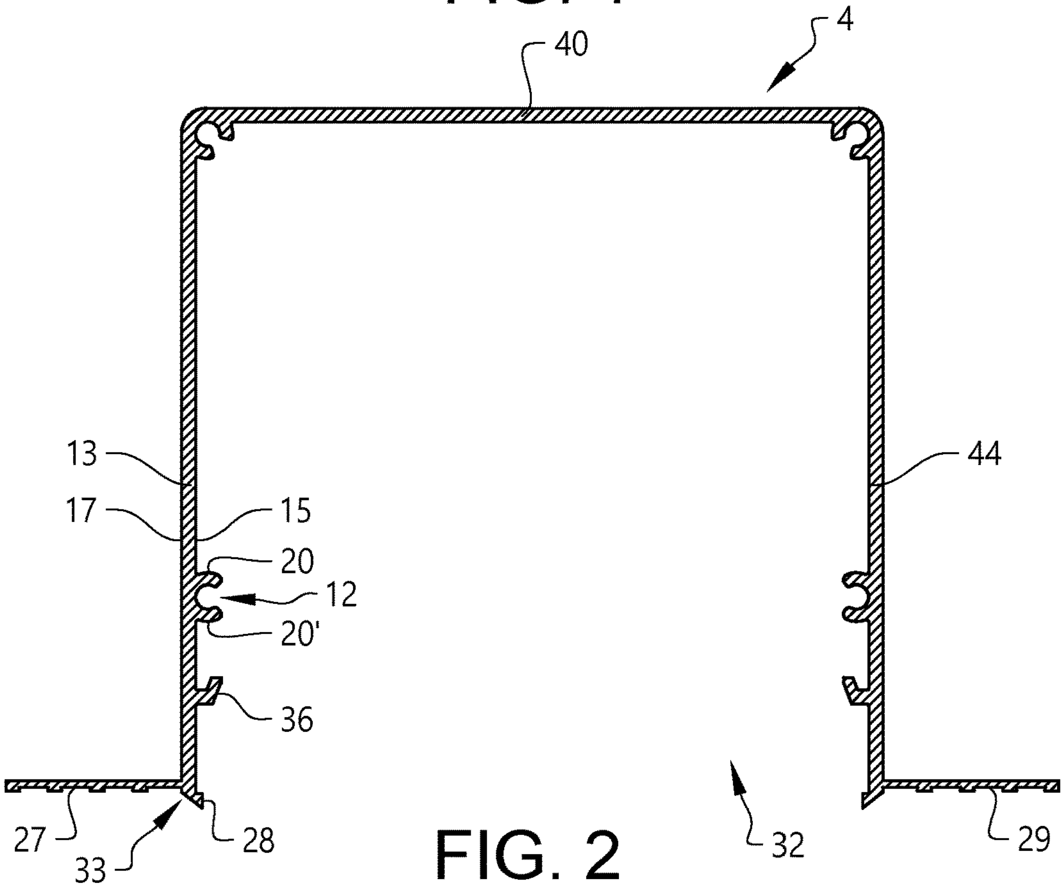
FIG. 2 is a cross section of an elongated support member in FIG. 1.
Figure 3:
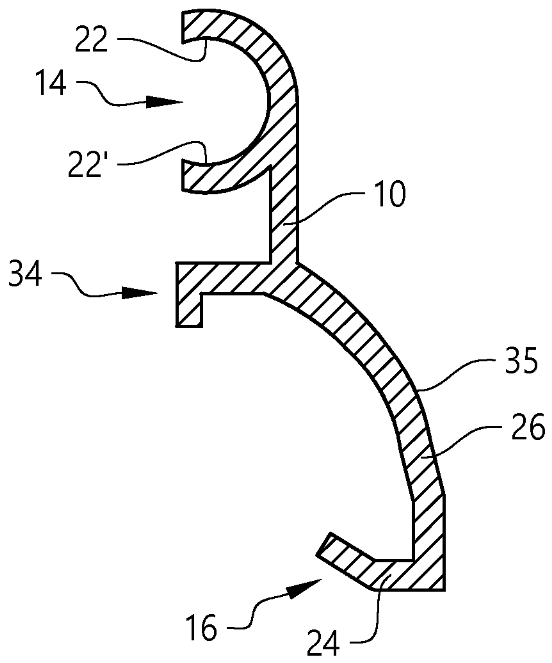
FIG. 3 is a cross section of a connection element in FIG. 1.
Figure 4:
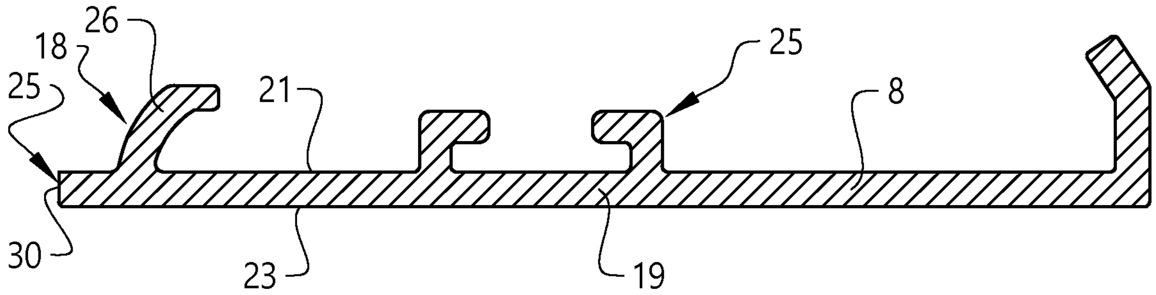
FIG. 4 is a cross section of a plate-shaped cover in FIG. 1.
Figure 6:
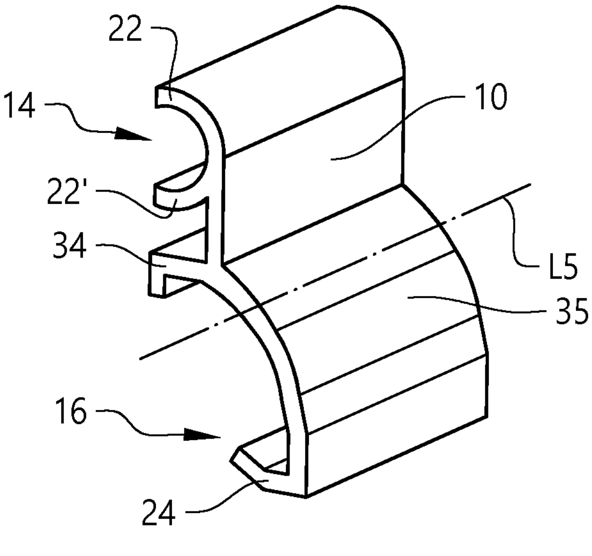
FIG. 6 is a perspective view of the connection element in FIG. 1, FIG. 7*a-e* show different stages of a connection procedure of the plate-shaped cover according to the first embodiment.

Referring now also to FIG. 2-4 showing cross sections of the elongated support member 4, a connection element 10 and the plate-shaped cover 8 in FIG. 1. Referring also to FIG. 6 showing a perspective view of the connection element 10 in FIG. 1.

The cover arrangement 2 further comprises a plurality of connection elements 10 for connecting the plate-shaped cover 8 to the elongated support member 4. Each one of the connection elements 10 and the elongated support member 4 comprises complimentary shaped first engagement means 12,14 so that the connection element 10 may be rigidly connected to the elongated support member 4 in an operative state. The first engagement means 12,14 are shaped complimentary to each other and adapted for a detachable connection of the connection elements 10 to the elongated support member 4.

Each one of the first engagement means 12,14 is formed in a one-piece unit with the respective one of the elongated support member 4 and the connection element 10. Further, each one of the first engagement means 12,14 defines an elongated shape in parallel with the longitudinal direction L2, L5 of the respective one of the elongated support member 4 and the connection element 10. Further, the first engagement means 12,14 is adapted for a snap connection or in other words a click connection.

Further, each one of the first engagement means 12,14 comprises at least one first projecting engagement portion 20,22. Further, at least one of said first projecting engagement portion 20,22 is elastic. The elasticity of one of said first engagement portions 20,22 is adapted for, during connection, allowing displacement in a transverse direction of one of said portions while bracing the other portion. A certain flexibility is thereby achieved to arrange the connection element 10 in its operative position and release the connection element 10 from the elongated support member 4 if desired. More specifically, the connection element 10 is formed in a plastic material, wherein a certain elasticity as achieved.

More specifically, the first engagement means 12 of the elongated support member 4 comprises two spaced first projecting engagement portions 20,20'. The two spaced first projecting engagement portions 20,20' jointly form a male structure. Each one of the first projecting engagement portions 20,20' forms a rib with an inclined or rounded external surface. Likewise, the first engagement means 12 of the connection element 10 comprises two spaced first projecting engagement portions 22, 22'. The two spaced first projecting engagement portions 22,22' jointly form a female structure, which is complimentary in relation to the male structure. Each one of the first projecting engagement portions 22,22' forms a rib with an inclined or rounded internal surface complimentary to the shape and dimension of the associated projecting engagement portions 20,20' of the elongated support member 4. Thus, the two spaced first projecting engagement portions 22,22' defines a receptacle for receiving the two spaced first projecting engagement portions 20,20'. The distance between the inner surfaces of the two spaced first projecting engagement portions 22,22' of the connection element 10 is larger at a free end of the portions than at a position between the free ends and the opposite ends of the portions. Turning now to the elongated support member 4, the distance between external surfaces of the two spaced first projecting engagement portions 20,20' is smaller at a free end of the portions than at a position between the free ends and the interior surface 15. In this way, the two spaced first projecting engagement portions 22, 22' of the connection element 10 are elastically displaced away from each other when receiving the two spaced first projecting engagement portions 20, 20' of the elongated support member 4.

Further, the elongated support member 4 has a plate-shaped portion 13 with an interior side 15 for facing the internal space and an exterior side 17 opposite the interior side adapted for facing a surface of the wall portion or roof portion. The engagement means 12 of the elongated support member 4 is arranged on the interior side 15 of the plate-shaped portion 13.

Further, the connection element 10 and the plate-shaped cover 8 comprises complimentary shaped pivot means 16,18 so that the plate-shaped cover 8 may be pivoted between a non-connected state and the connected state in relation to the elongated support member when the connection element 10 is in its operative state in relation to the elongated support member.

The pivot means 16 of the connection element 10 comprises a hook-shaped portion 24, which is adapted to form a pivot axis for the plate-shaped cover 8. In a similar fashion, the pivot means 18 of the plate-shaped cover 8 comprises a hook-shaped portion 26, which is adapted to engage with the complimentary shaped hook-shaped portion 24 of the connection element 10.

Each one of the pivot means 16,18 is formed in a one-piece unit with the respective one of the connection element 10 and the elongated cover 8. Further, each one of the pivot means 16,18 defines an elongated shape in parallel with the longitudinal direction L5, L1 of the respective one of the connection element 10 and the elongated cover 8.

The plate-shaped cover 8 comprises a plate shaped portion 19 with an interior side 21 for facing the internal space and an exterior side 23 opposite the interior side. The pivot means 18 is arranged in the vicinity of an edge 25 of the plate shaped portion 19 between the interior side and the exterior side. Further, the pivot means 18 is arranged on the interior side 21 of the plate-shaped portion 19.

Further, the elongated support member 4 and the plate-shaped cover 8 comprises complimentary shaped second engagement means 28,30 for fixing the plate-shaped cover 8 in the connected state in relation to the elongated support member 4. The second engagement means 28 of the elongated support member 4 is formed by a support surface on the interior surface 15 of the plate-shaped portion 13 in the vicinity of an edge 33 between the interior surface 15 and the exterior surface 17 of the plate-shaped portion 13. The second engagement means 30 of the plate-shaped cover 8 is formed by an edge surface of the edge 25 of the plate shaped portion 19. Thanks to the elasticity of the connection element 10 and the design of the pivot means 16,18, the plate-shaped cover 8 will be pushed against the elongated support member 4, wherein the second engagement means 28,30 will engage. This design has the effect to minimize any gap between the elongated support member 4 and the plate-shaped cover 8.

The plate-shaped portion 13 has a rectangular shape with a longer extension in the longitudinal direction L2 of the elongated support member 4. Further, the plate-shaped portion 13 is adapted for being arranged in contact with the wall portion or roof portion. The second engagement means 28 is arranged along a long side edge of the plate-shaped portion 13. The first engagement means 12 is arranged in parallel with the long side edge of the plate-shaped portion 13 and at a distance from the long side edge.

Further, the elongated support member 4 comprises two plate shaped fastening parts 27,29 extending perpendicularly outwards in opposite directions. Each one of the plate shaped fastening parts 27,29 is formed in a one-piece unit with an associated plate-shaped portion of the elongated support member 4 at an edge thereof. The plate shaped fastening parts 27,29 are adapted for fastening in a wall, for example via a skim plaster layer 31, see FIG. 14*b*. The plate shaped fastening part 27,29 therefore comprises a plurality of parallel and spaced ribs.

Referring now to FIG. 5. The connection element 10 is arranged so that the pivot means 16 is positioned at a distance from the adjacent surface 15 of the elongated support member 4 when the connection element 10 is in its operative state in relation to the elongated support member 4 so that the pivot means 18 of the elongated plate-shaped cover 8 may enter into engagement with the pivot means 16 of the connection element 10 via the space between the pivot means 16 of the connection element 10 and the adjacent surface 15 of the elongated support member 4.

The connection element 10 comprises a projection 35 which has a curved shape defining a receptacle for an edge section of the plate-shaped cover 8 during connection and disconnection, wherein the receptacle is defined by the projection 35 in one direction and by the plate shaped portion 13 of the elongated support member 4 in the other direction, wherein the receptacle is open for receiving the edge section of the plate-shaped cover 8 during connection and disconnection and wherein the projection 35 comprises the hook-shaped portion 24 at the free end, wherein the hook-shaped portion 24 extends into the receptacle.

Referring now to FIGS. 2, 3 and 6. The connection element 10 further comprises a positioning portion 34 adapted for engaging a complimentary shaped portion 36 of the elongated support member 4 for positioning the connection element 10 relative to the elongated support member 4 during engagement of the first engagement means 12,14. The positioning portion 34 is formed by a projection from a body of the connection element 10. During mounting of the connection element 10 to the elongated support member 4, the positioning portion 34 is first engaged with the projection 36. Then, the connection element 10 may be turned around a pivot axis formed by the positioning portion 34 and the projection 36 until the first engagement means 12,14 engage each other.

The first engagement means 14, the support portion 34 and the pivot means 16 are arranged on a first side of the connection element 10. The connection element 10 comprises an operator contact surface 35 on a second side of the connection element 10, wherein the second side is opposite the first side. The operator contact surface 35 is adapted for being contacted by an operator fingers for pushing the connection element 10 to engagement with the elongated support member via the first engagement means 12,14.

The distance between a free end of the hook-shaped pivot means 16 of the connection element 10 and the interior surface 15 of the elongated support member 4 perpendicular to a plane in parallel with the elongated plate-shaped portion 13 of the elongated support member 4 is about the same as or larger than an extension of the elongated plate-shaped cover 8 at the position of the hook-shaped pivot means 18 in a direction perpendicular to a plane in parallel with the plate-shaped portion 19 of the elongated plate-shaped cover 8 for allowing introduction of the edge section of the elongated plate-shaped cover 8 during connection.

The elongated support member 4 has a shape defining an elongated aperture 32 extending in parallel with the longitudinal direction L2 of the elongated support member 4 and the elongated plate-shaped cover 8 is adapted to partly close the elongated aperture 32 when the elongated plate-shaped cover 8 and the elongated support member 4 are in a connected state. More specifically, the elongated plate-shaped cover 8 has an extension perpendicular to its longitudinal direction L1, that is smaller than an extension between the opposite walls of the elongated support member 4 defining the aperture 32 perpendicular to its longitudinal direction L2. In this way, a gap/slot is formed between a long side edge 37 of the elongated plate-shaped cover 8 and an adjacent inner surface 39 of the elongated support member 4, see figure S.

Turning now again to FIG. 1. The elongated support member 4 comprises a second plate-shaped portion 40, which is arranged perpendicularly in relation to the first plate-shaped portion 13. The second plate-shaped portion 40 has a rectangular shape. The second plate-shaped portion 40 is elongated with a longitudinal direction in parallel with the longitudinal direction L2 of the support member 4. The second plate-shaped portion 40 is connected to the first plate-shaped portion 13 at an end of the first plate-shaped portion opposite the edge 33. Further, the first plate-shaped portion 13 and the second plate-shaped portion 40 are formed in a one-piece unit.

Further, the elongated support member 4 comprises a third plate-shaped portion 44, which is arranged in parallel with and at a distance from the first plate-shaped portion 13. The third plate-shaped portion 44 has a rectangular shape and more specifically of the same size and shape as the first plate-shaped portion 13. The third plate-shaped portion 44 is elongated with a longitudinal direction in parallel with the longitudinal direction L2 of the support member 4. The third plate-shaped portion 44 is connected to the first plate-shaped portion 13 via the second plate-shaped portion 40. More specifically, the first, second and third plate-shaped portions 13, 40, 44 are formed in a one-piece unit.

In other words, the support member 4 comprises an elongated back plate 40 and two spaced elongated side plates 13, 44 forming a U-shape in cross section. Further, the back plate 40 and the two spaced elongated side plates 13, 44 are formed in a one-piece unit. More specifically, the elongated support member 4 has a rectangular shape in a cross section, wherein the elongated aperture 32 defines an open side of the rectangle. More specifically, the elongated support member 4 has a substantially square shape in a cross section perpendicular to its longitudinal direction L2.

Other designs are of course possible, especially with such a design that a depth of the elongated support member is larger than a height of the elongated support member for housing several coverings. Further, the elongated support member 4 does not comprise any end plates closing the elongated aperture in the longitudinal direction of the support member. Such end plates may however be attached at the opposite ends of the support member. Holders for the covering may be attached to such end plates. Alternatively, holders for the covering may be attached to any one of the plate-shaped portions 13,40,44 defining the elongated aperture in a transverse direction of the support member, see FIG. 17. According to a further alternative, for the example where the support member 4 does not comprise any end plates closing the elongated aperture in the longitudinal direction of the support member, holders for the covering may be attached directly to the wall or roof at the opposite ends of the support member.

Referring again to FIG. 1. The elongated support member 4 comprises means 50,52 for attachment of the support member 4 to the wall or roof portion. The attachment means 50,52 are here formed by through holes in the back plate 40 for receipt of fasteners, like screws or rivets.

FIG. 7*a*-*d* show different stages of a connection of the cover arrangement 2 according to the first embodiment. A plurality of connection elements 10 are first attached to the elongated support member 4 in a spaced relationship in the longitudinal direction of the elongated support member 4. The elongated plate-shaped cover 8 is initially positioned with its longitudinal direction L1 substantially in parallel with the longitudinal direction L2 of the elongated support member 4. More specifically, the elongated plate-shaped cover 8 is initially directed so that its plate-shaped portion 19 is substantially in parallel with the plate-shaped portion 13 of the elongated support member 4.

Figure 7A:
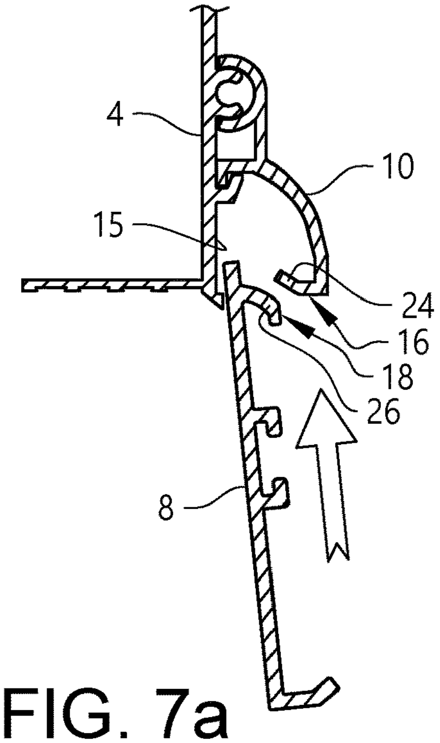

Further, the elongated plate-shaped cover 8 is moved relative to the elongated support member 4 so that a longitudinal side edge of the elongated plate-shaped cover 8 is introduced in, the spacing between the pivot means 16 of the connection element 10 and the adjacent inner surface 15 of the elongated support member 4, see arrow in FIG. 7*a*. Further, the elongated plate-shaped cover 8 is moved in this direction until the hook-shaped portion 26 of the elongated plate-shaped cover 8 has passed the hook-shaped portion 24 of the connection element 10.

Figure 7B:
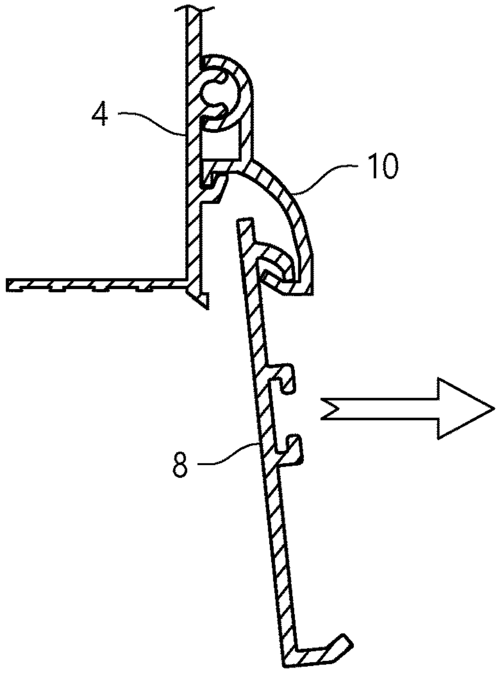

In a next step, the elongated plate-shaped cover 8 is moved in a transverse direction relative to the longitudinal direction L2 of the elongated support member 4 away from the elongated support member 4 so that the pivot means 16,18 engage each other, see arrow in FIG. 7*b*.

Figure 7C:
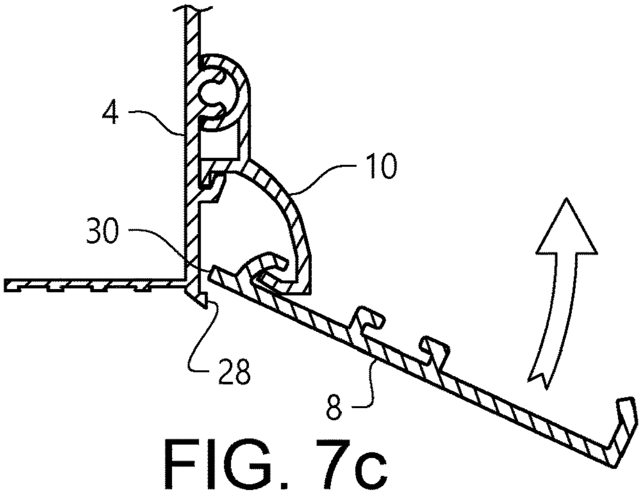

The elongated plate-shaped cover 8 is then turned relative to the elongated support member 4 around a pivot axis formed by the pivot means 16,18, see arrow in FIG. 7*c*, until the second engagement means 28,30 engage each other.

Figure 7D:
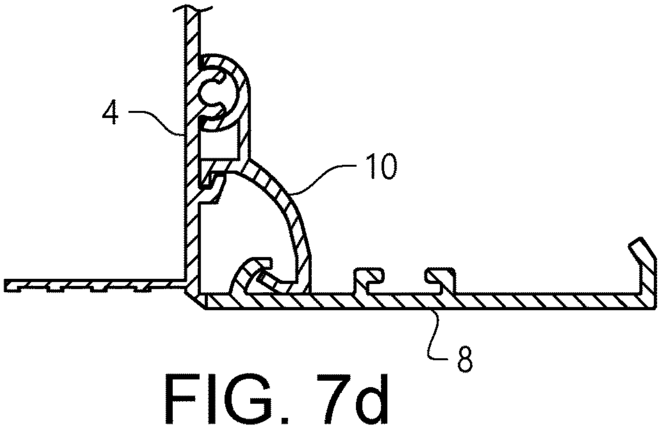

A long side edge of the elongated plate-shaped cover 8 will then contact the interior surface of the elongated support member 4 and the hook-shaped portion 24 of the connection element 10 will flex somewhat during a further turning of the elongated plate-shaped cover 8 to its final position shown in FIG. 7*d*, wherein a tight fit will be achieved between the edge of the elongated plate-shaped cover and the interior surface of the elongated support member.

The elongated plate-shaped cover 8 will in the final position, see FIG. 7*d*, be positioned so that the plane defined by the plate-shaped portion 19 of the plate-shaped cover 8 is inclined with an angle of 90° in relation to the plane defined by the plate-shaped portion 13 of the elongated support member 4.

Figure 7E:
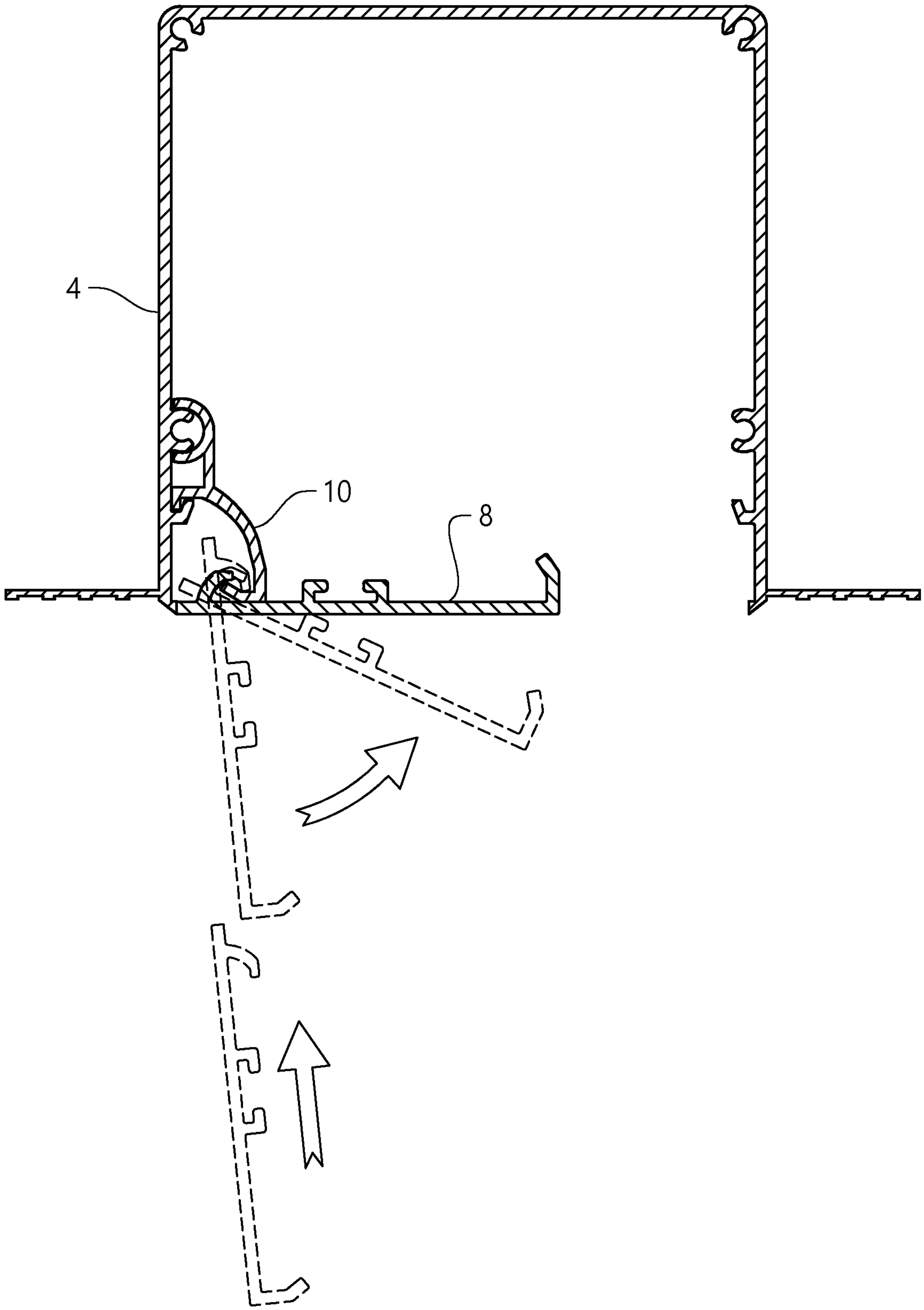

In FIG. 7*e*, the steps for connecting the elongated plate-shaped cover 8 to the elongated support member 4 via the connection element 10 according to FIG. 7*a*-*d* are shown.

According to an alternative design of a cover arrangement, a single elongated support member may have a plurality of elongated plate-shaped covers connected to it. In such a case, the covers may be arranged next to each other in the longitudinal direction of the support member. For such an alternative, the elongated plate-shaped cover 8 comprises a means 25, see FIG. 4, for connection to an adjacent cover in order to keep the covers together and minimize any gap between the covers. The connection means 25 is formed by a projecting structure on the interior side 21 of the cover 8. Also the adjacent cover would then have such a connection means at its short side edge facing the other cover. More specifically, the connection means 25 is adapted for receipt of a pin or other connection element for bridging the distance between the covers.

Figure 8:
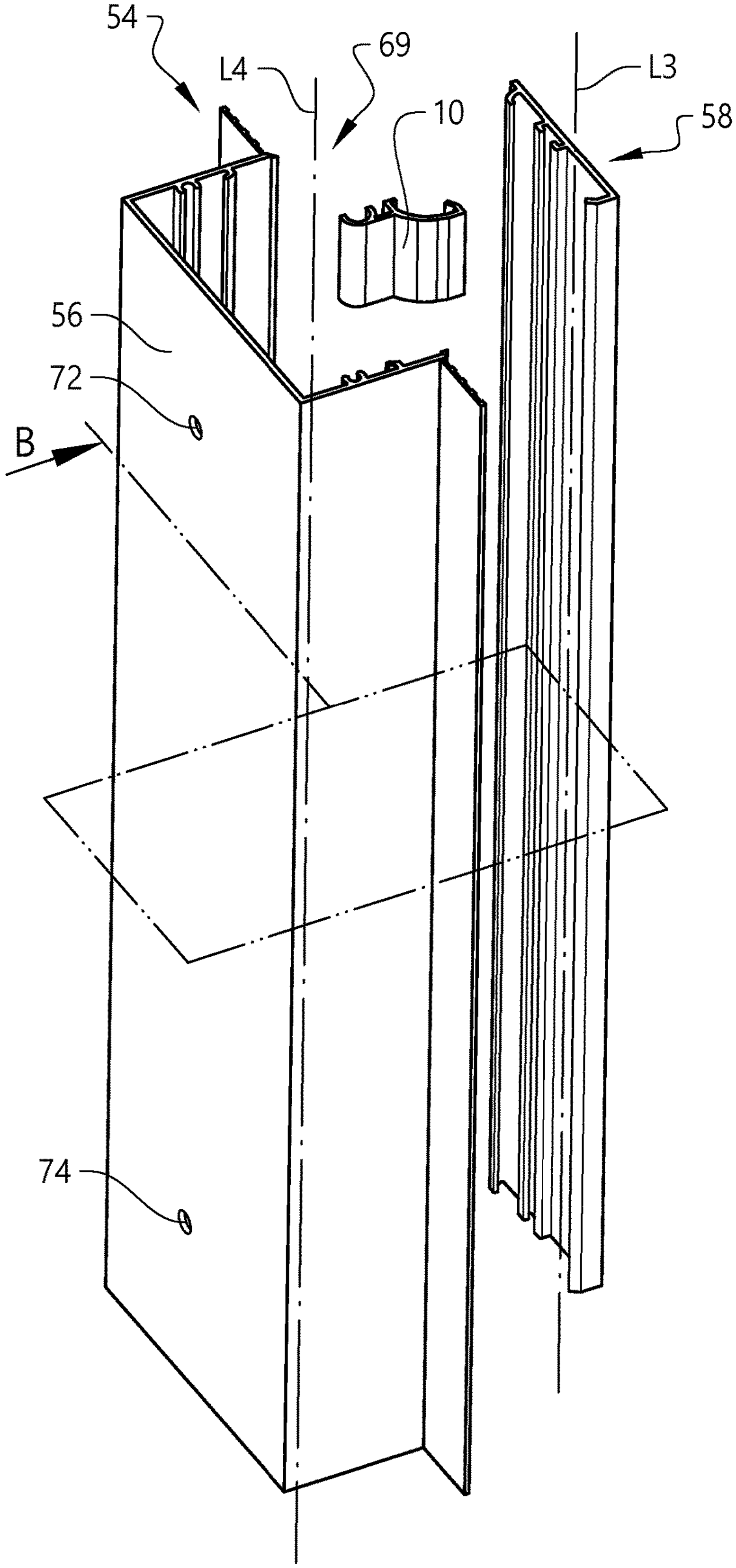
FIG. 8 is a perspective exploded view from the top of a cover arrangement according to a second embodiment.
Figure 9:
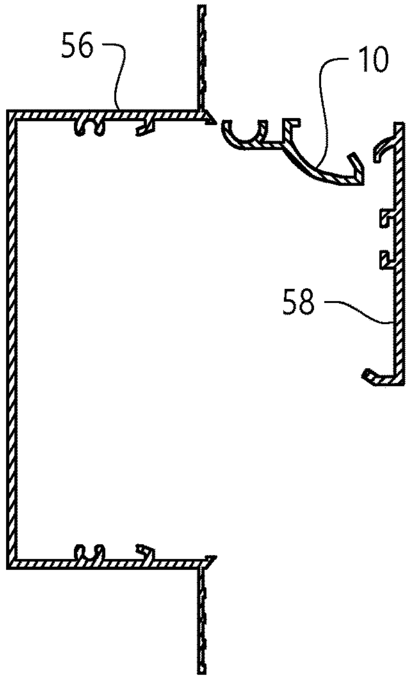
FIG. 9 is a cross section of the cover arrangement in FIG. 8.

FIGS. 8 and 9 show a second embodiment of a cover arrangement 54 for mounting in a wall or roof for supporting the at least one extendable covering (not shown). The cover arrangement 54 comprises an elongated support member 56 adapted to be attached to a wall portion or roof portion defining the opening. More specifically, the elongated support member 56 is adapted for supporting and/or concealing a lateral edge of the at least one extendable covering. More specifically, the elongated support member 56 is adapted for housing a rail or guide, which in turn is adapted for a guiding of the lateral edge of the covering. More specifically, the elongated support member 56, or rail or guide, if applicable, is adapted for supporting a lateral edge of the at least one extendable covering, which edge is in parallel with a movement direction between the retracted state and the extended state.

The cover arrangement 54 further comprises an elongated plate-shaped cover 58 adapted to be supported by the elongated support member 56 via one or more connection elements 10 in a way that the elongated plate-shaped cover projects from the elongated support member so that it at least partly can conceal the internal space defined by the elongated support member 56. Further, the elongated plate-shaped cover 58 may be arranged for at least substantially concealing the elongated support member 56. The elongated plate-shaped cover 58 is adapted for connection to the elongated support member 56 in a way that a longitudinal direction L3 of the elongated plate-shaped cover 58 is in parallel with a longitudinal direction LA of the elongated support member 56 in a connected state. Further, the elongated plate-shaped cover 58 is devoid of any slot for the covering.

The connection between the elongated support member 56, the connection elements 10 and the plate-shaped cover 58 is similar to what has been described above for the first embodiment and will therefore not be repeated here.

The elongated support member 56 has a shape defining an elongated aperture 69 extending in parallel with the longitudinal direction L4 of the elongated support member 56 and the elongated plate-shaped cover 58 is adapted to partly close the elongated aperture 69 when the elongated plate-shaped cover 58 and the elongated support member 56 are in a connected state. More specifically, the elongated plate-shaped cover 58 has an extension perpendicular to its longitudinal direction L3, that is smaller than an extension between the opposite walls of the elongated support member 56 perpendicular to its longitudinal direction L4. In this way, a gap/slot is formed between a long side edge of the elongated plate-shaped cover 58 and an adjacent inner surface of the elongated support member 56.

The cover arrangement 54 has to a great extent a similar design as has been described above for the cover arrangement 2 according to the first embodiment. The following description of the second embodiment of the cover arrangement 54 will therefore focus on the differences in relation to the first embodiment of the cover arrangement 2.

The elongated support member 56 according to the second embodiment has substantially the same width as a width of the support member 4 according to the first embodiment. Further, the elongated support member 56 according to the second embodiment has a substantially smaller depth in relation to a depth of the support member 4 according to the first embodiment. This is due to the fact that the elongated support member 4 according to the first embodiment is adapted for accommodating one or a plurality of coverings while the elongated support member 56 according to the second embodiment is adapted for supporting and/or guiding and/or concealing a lateral edge of the covering during movement of the covering. The depth and width are defined in perpendicular directions and both are perpendicular to the longitudinal direction of the respective elongated support member 4, 56. In other words, the elongated support member 56 according to the second embodiment has a rectangular shape in a cross section with a longer extension in the width direction than in the depth direction.

The elongated support member 56 according to the second embodiment is provided with at least one means 72,74 for connection to the wall portion. The connection means 72,74 are formed by through holes for receipt of a fastener, such as a screw or rivet.

Figure 10:
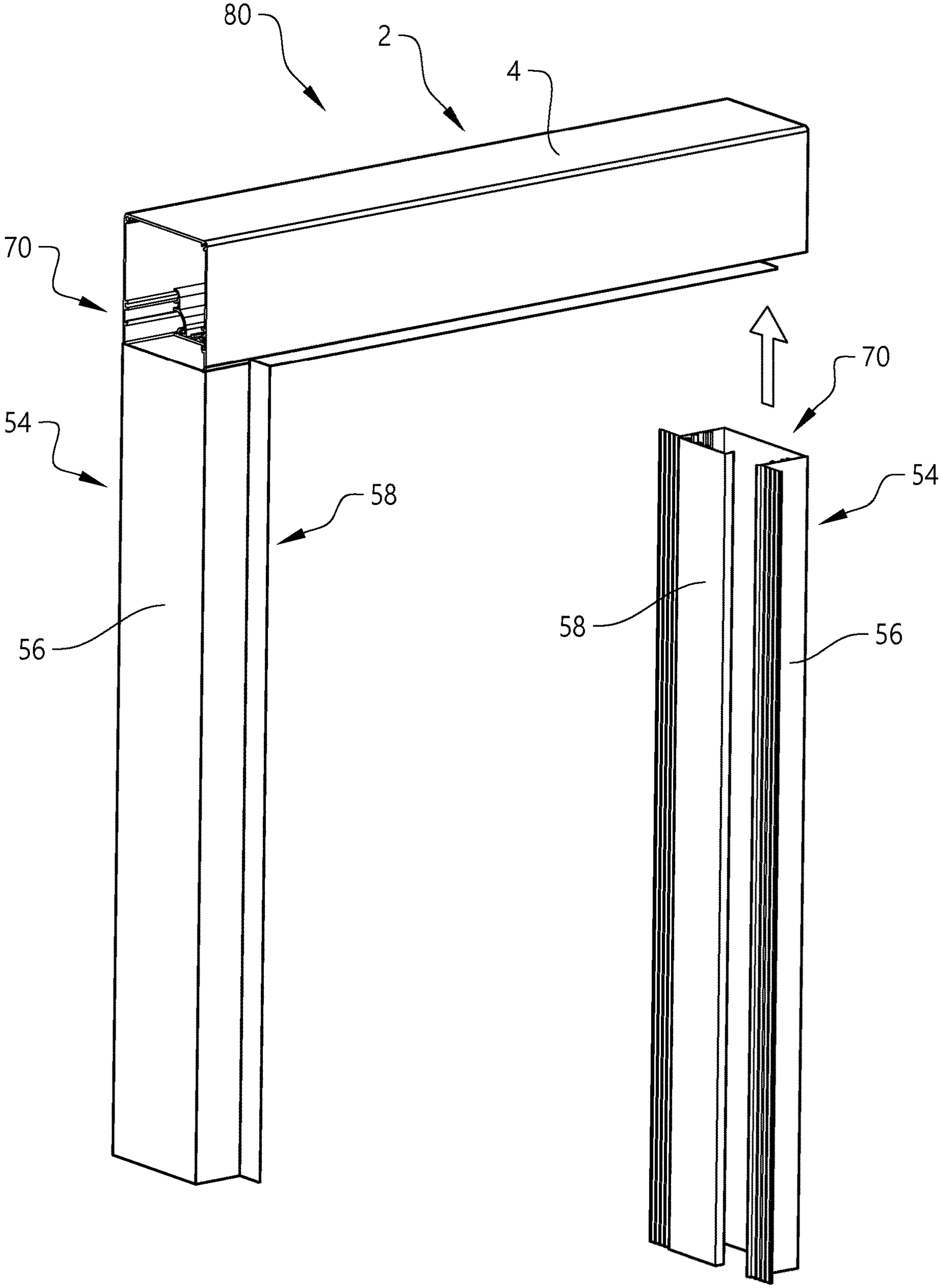
FIG. 10 is a perspective view from the top of a third embodiment of a cover arrangement.

The elongated support member 4 according to the first embodiment and the elongated support member 56 according to the second embodiment may be arranged in relation to each other in a way that the longitudinal directions are perpendicular to each other, see FIG. 10. Further, the elongated support member 56 according to the second embodiment has an open end 70 in its longitudinal direction for allowing movement of the covering from a retracted state inside the elongated support member 4 according to the first embodiment and into the elongated support member 56 according to the second embodiment.

FIG. 10 is a perspective view from the top of a third embodiment of a cover arrangement 80. The cover arrangement 80 according to the third embodiment comprises one cover arrangement 2 according to the first embodiment and two cover arrangements 54 according to the second embodiment, wherein the two cover arrangements 54 according to the second embodiment are arranged in a mirrored relationship so that the elongated plate-shaped covers 58 face each other. Further, the two cover arrangements 54 according to the second embodiment are positioned spaced from each other and in parallel relationship. Further, the two elongated support members 56 of the cover arrangements 54 according to the second embodiment are arranged at opposite ends of the elongated support member 4 of the cover arrangement 2 according to the first embodiment.

Figure 11:
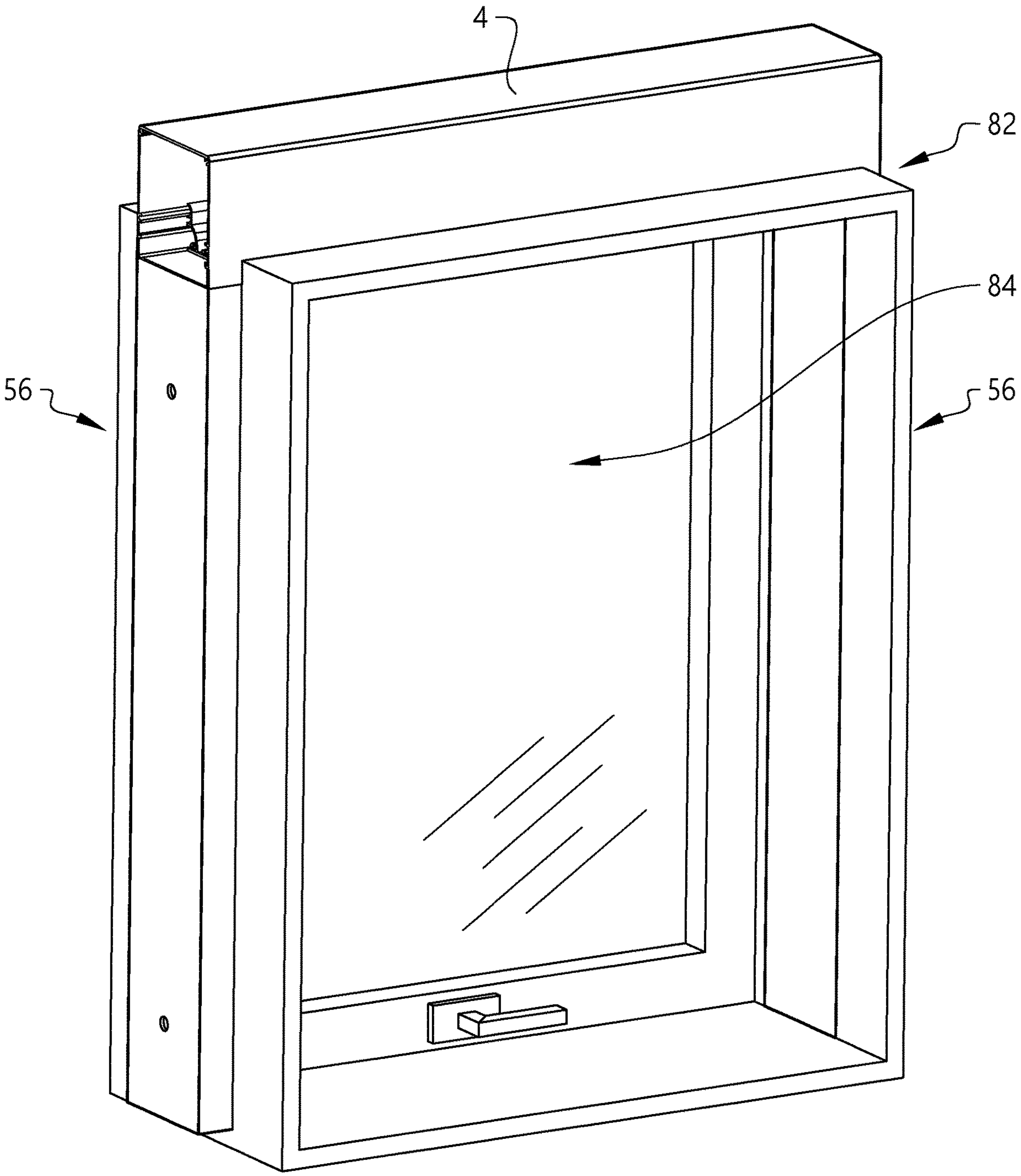
FIG. 11 is a perspective view of a wall portion comprising a window with the elongated support member according to FIG. 10 installed and with plate-shaped covers of a design completely closing the internal space of the respective elongated support member.

FIG. 11 is a perspective view of a wall portion 82 defining a window opening 84. The wall portion 82 has an elongated groove 86*a*, 86*b*, see FIGS. 13*a* and 14*a*, adapted for receipt of the elongated support members 4, 56. More specifically, the elongated groove 86*a*, 86*b* extends along three sides of a rectangle. The elongated support member 4, 56 is at least to a great extent and preferably almost entirely received in the groove 86*a*,86*b*.

More specifically, the elongated support members 56 are arranged at the respective ends of the elongated support member 4 in a way that an installed covering may be extended from a retracted state within the elongated support member 4 while its edge being supported, concealed and/or guided by the elongated support members 56.

In FIG. 11, an elongated plate-shaped cover with an extension perpendicular to its longitudinal direction substantially similar to an extension between the opposite walls of the associated elongated support member 4,56 is connected to the elongated support member 4,56. Thus, in FIG. 11, the elongated plate-shaped cover completely closes the aperture defined by the respective elongated support member 4,56. Such a solution may be advantageous in that the cover arrangement devoid of any covering may be built in adjacent/around a window at the construction of a building and at a later point in time, the elongated plate-shaped covers may be removed from the elongated support member and a selected covering and associated rails/guides may be mounted inside of the elongated support members.

For releasing (disconnecting) such an elongated plate-shaped cover from the elongated support member 4,54, a tool, such as a screwdriver, may be squeezed in between the elongated plate-shaped cover and the elongated support member 4 and by turning the tool, the long side edge of the elongated plate-shaped cover may be accessible for further turning of the elongated plate-shaped cover 8 around the pivot axis.

According to an alternative, for releasing (disconnecting) the elongated plate-shaped cover from the elongated support member 4, it may be possible to push the elongated plate-shaped cover 8 on its exterior side at the edge section, wherein a turning movement around the pivot axis defined by the pivot means 16,18 is achieved.

After the mounting of the covering and associated rails/guides, the elongated plate-shaped covers 8, 58 as have been described above, may be connected to the respective elongated support member 4,54. The elongated plate-shaped cover 8,58 has a smaller extension transverse to the longitudinal direction than the removed elongated plate-shaped cover. In this way, the covering may be rolled in/out and guided via the gaps/slots formed between the longitudinal edge of the elongated plate-shaped cover and the adjacent internal surface of the elongated support member.

Figure 12:
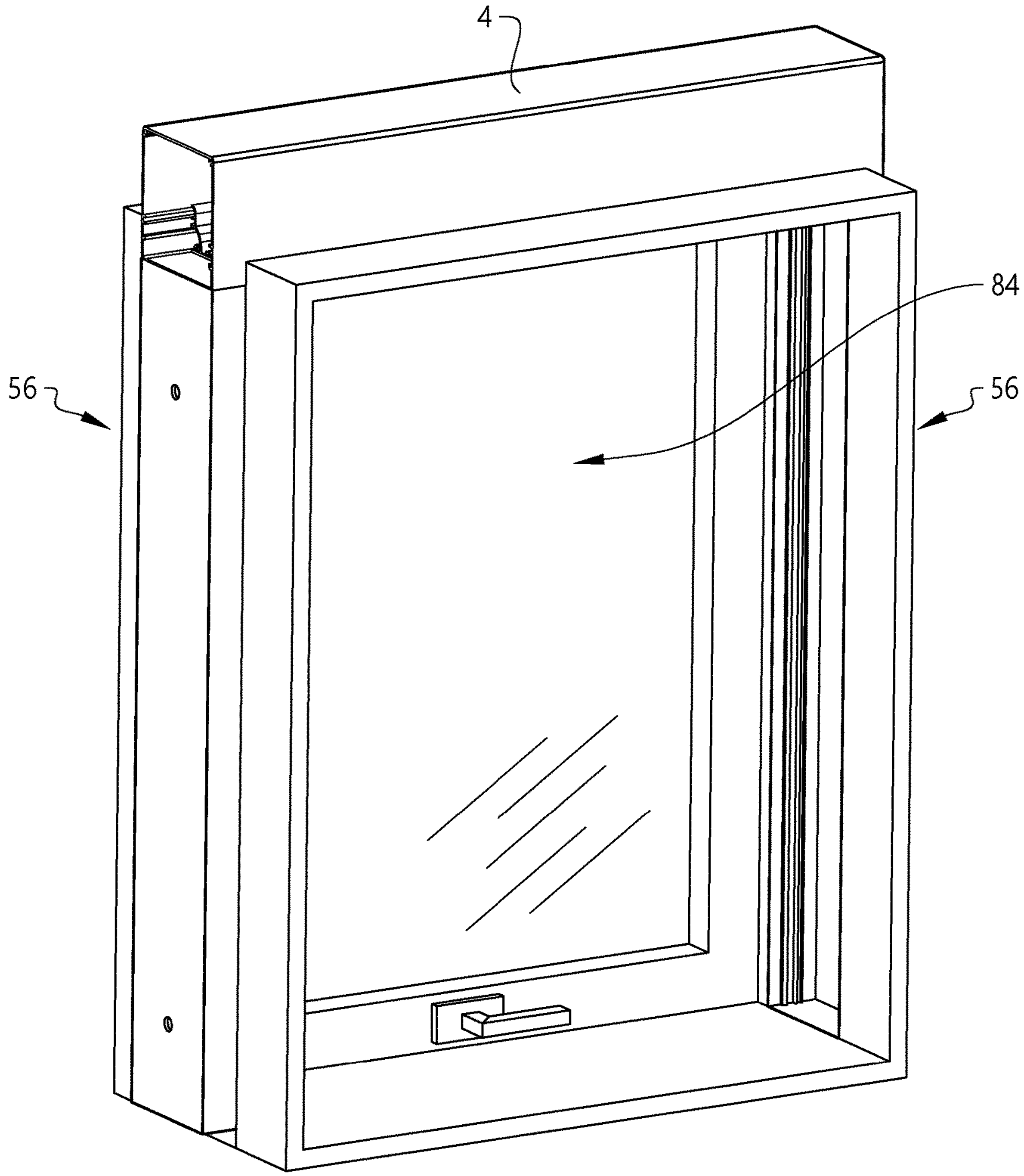
FIG. 12 is a perspective view of the wall portion according to FIG. 11 with the covers removed, FIGS. 13*a, b* and 14*a, b* are cross sections of the cover arrangement according to FIG. 10 when installed in a wall.

FIG. 12 is a perspective view of the wall portion 82 defining the window opening 84 similar to FIG. 11, but with the elongated plate-shaped covers removed.

Figure 13A:
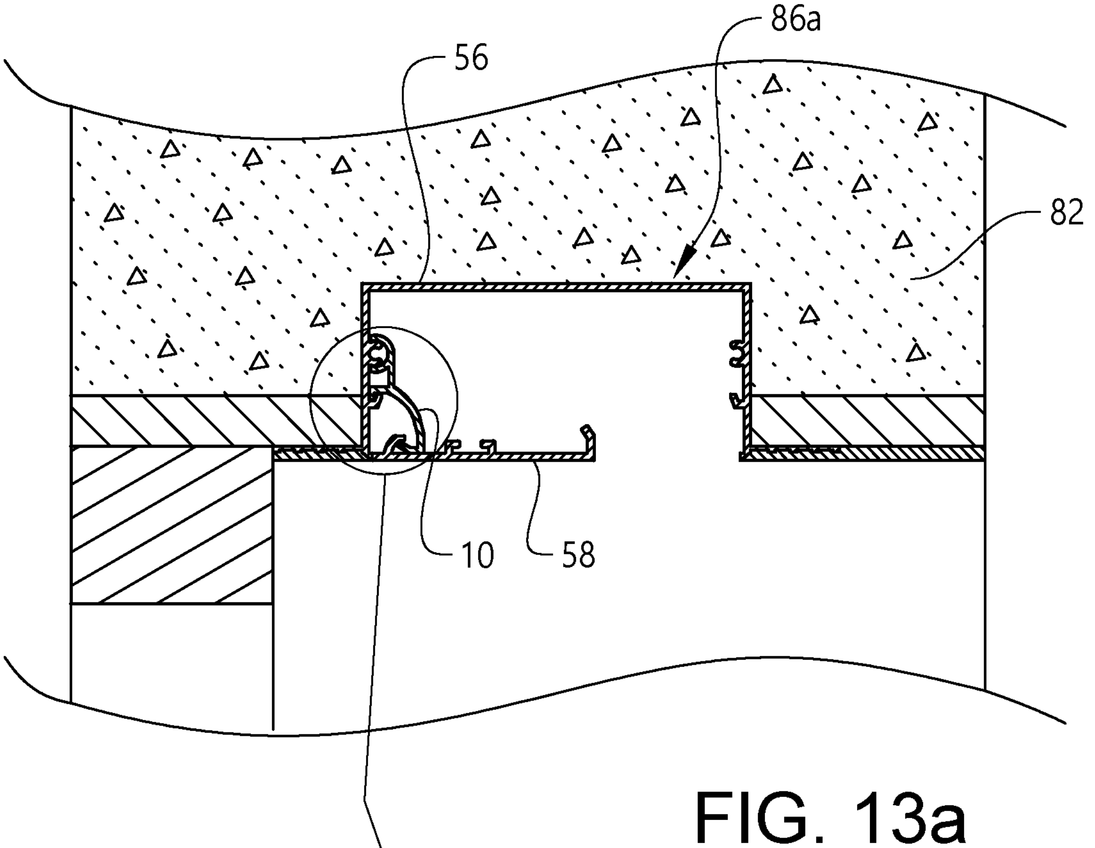
Figure 14A:
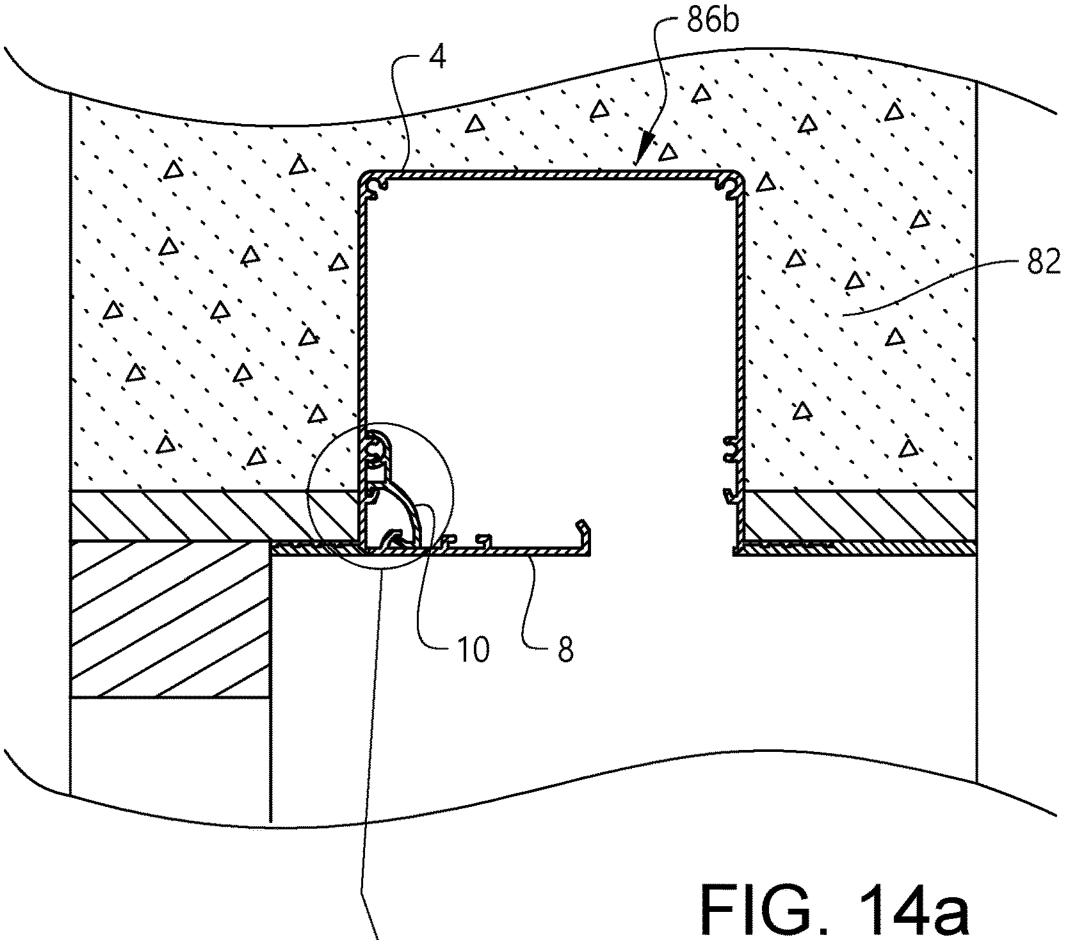

FIGS. 13*a* and 14*a* shows a cross sectional view of the wall portion 82 comprising the cover arrangement 54 according to the second embodiment and the cover arrangement 4 according to the first embodiment, respectively. The wall portion 82 comprises a wall portion 88, which may comprise a board, like a plasterboard.

Figure 14B:
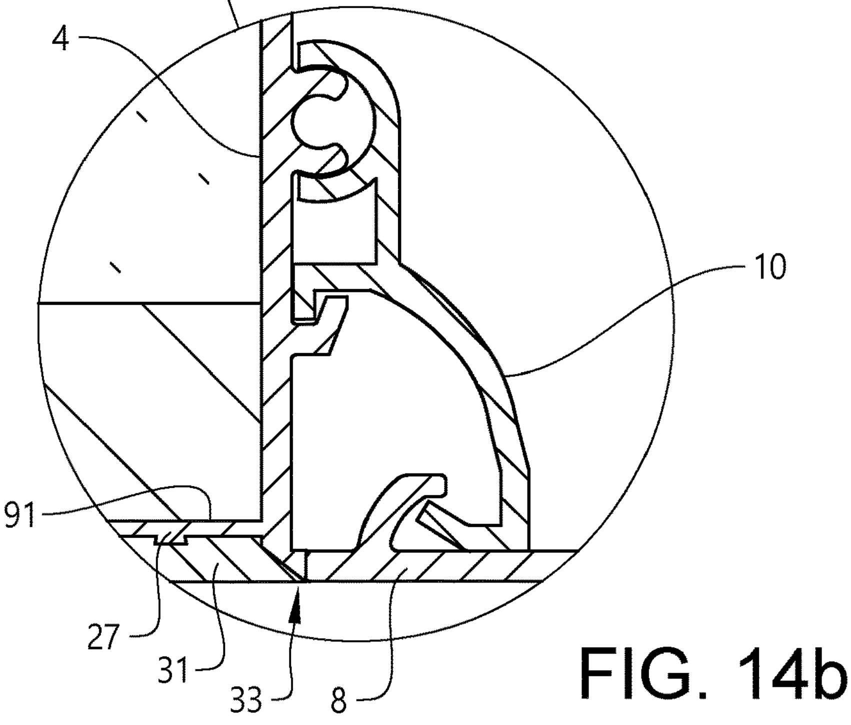

Turning now to the enlargement in FIG. 14*b*, the elongated support member 4 is arranged in such a way that a main side surface of the first plate-shaped portion 13 is in contact with the wall portion 82. Further, the elongated support member 4 is arranged in such a way that the plate shaped fastening parts 27,29 are in contact with an exterior surface 91 of the wall portion 82. The edge 33 will then project a distance from the exterior surface 91 of the wall portion 82. A layer of skim plaster coat 31 is applied on the external surface of the plate shaped fastening parts 27,29 and on an exposed portion of the exterior surface 91 of the wall portion 82 all the way to the edge 33.

Figure 13B:
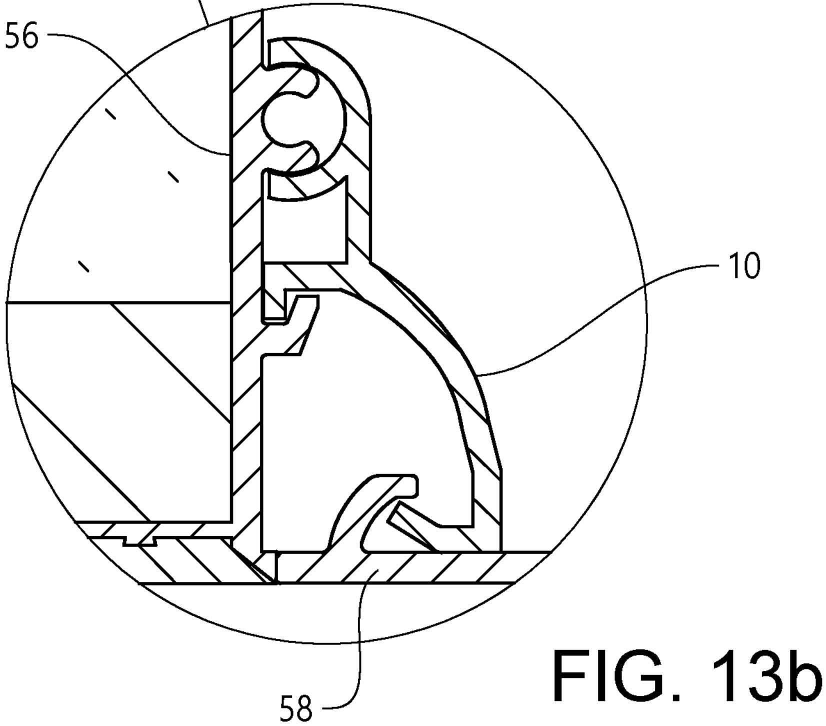

The elongated support member 56 according to the second embodiment is arranged in the wall portion 82 in a similar way as has been described above for the elongated support member 4 according to the first embodiment, see enlargement in FIG. 13*b*. It will therefore not be further explained here.

Figure 15:
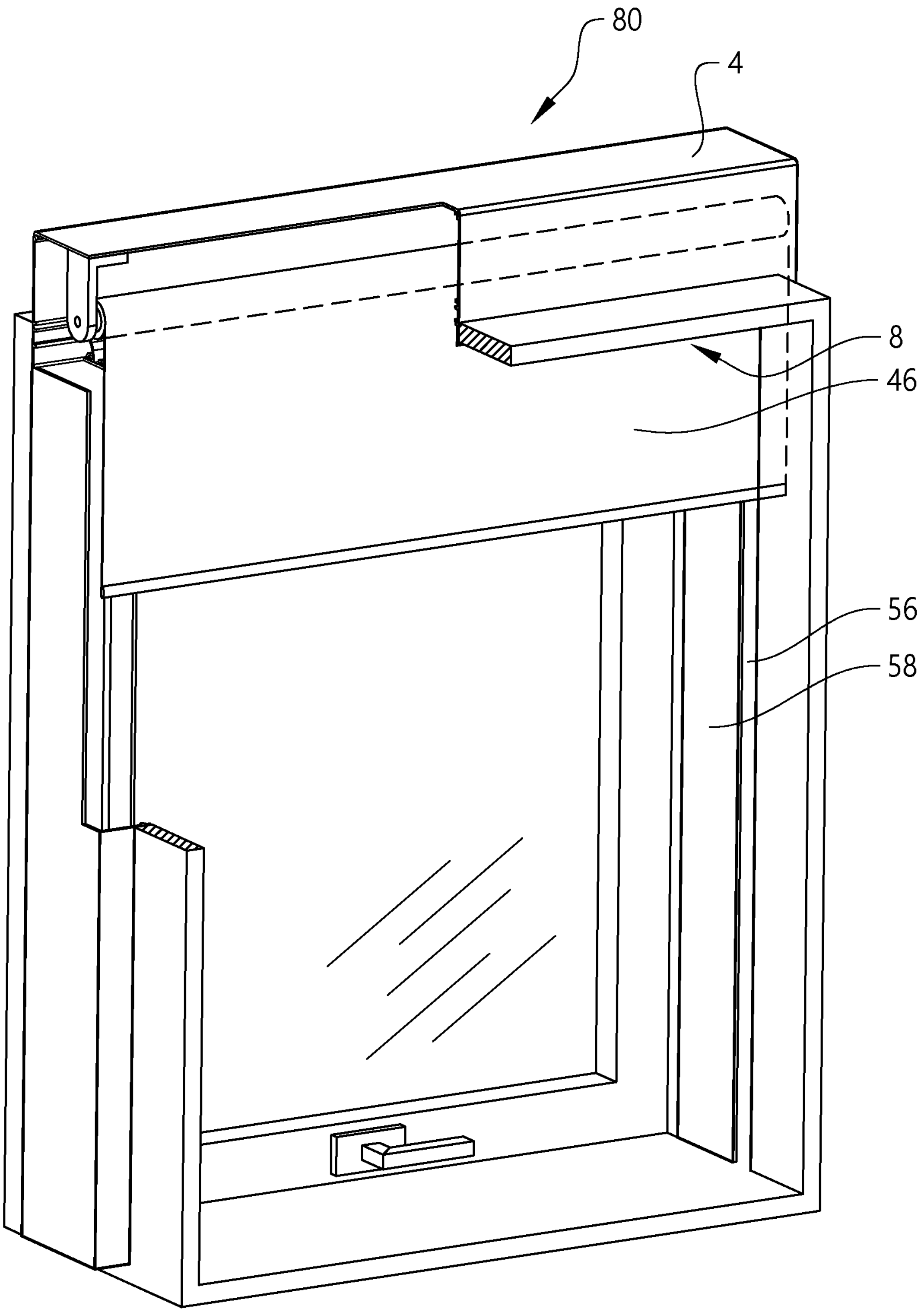
FIG. 15 is a perspective view similar to FIG. 10 and FIGS. 13*a, b* and 14*a, b* with a covering installed.

FIG. 15 is a perspective view similar to FIG. 11 with covers 8,58 accordingly installed. The elongated cover 58 for the lateral elongated support member 56 is designed so that the gap/slot is in alignment with a gap/slot formed between the elongate plate-shaped cover 8 and the upper elongated support member 4. The cover arrangement 80 comprises a covering 46 in the form of a blind rolled up on a roller, which is installed in the upper elongated support member 4 arranged above the window. The covering 46 may be rolled out/in via the gaps/slots.

Figure 16:
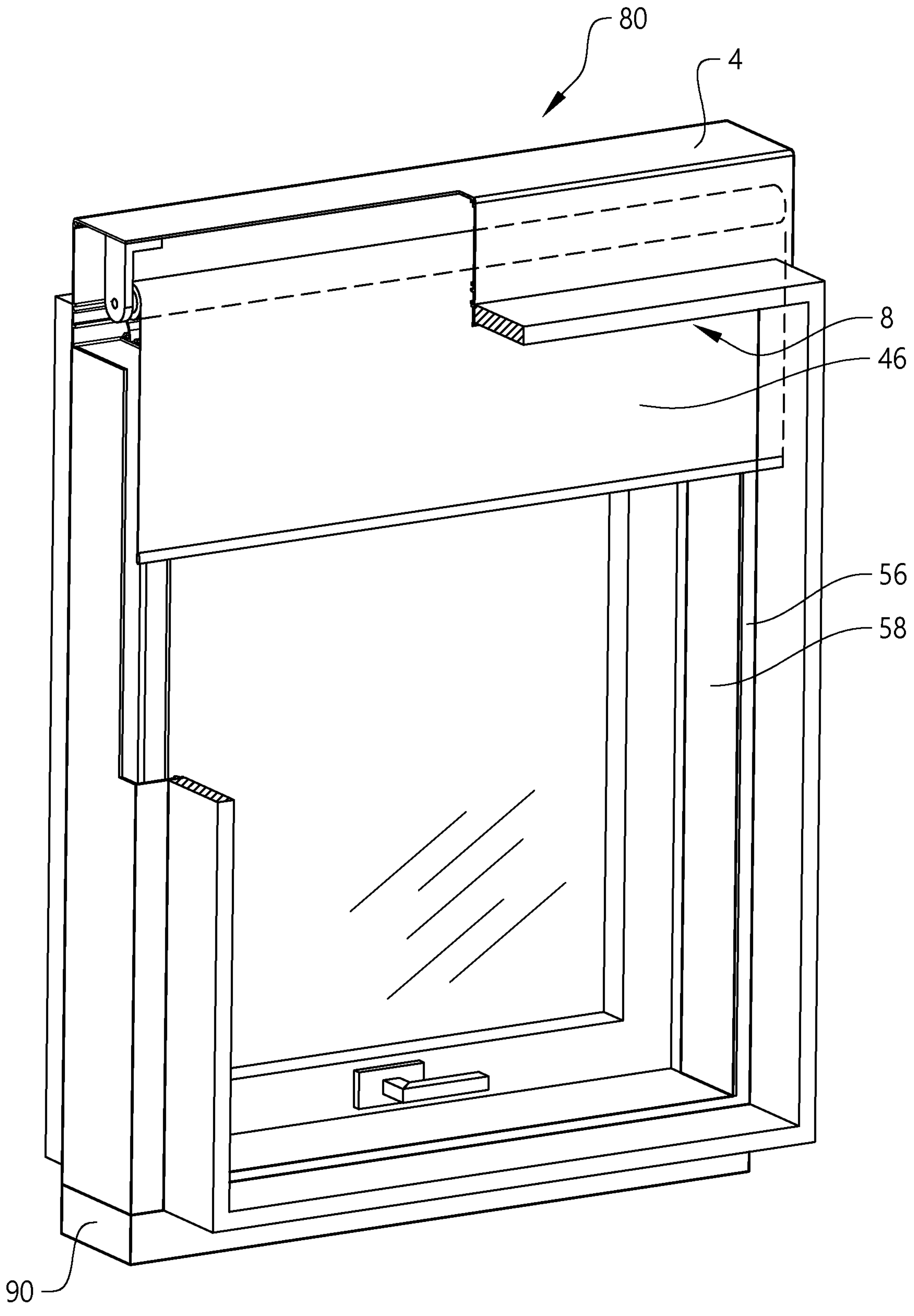
FIG. 16 shows an alternative embodiment to the one in FIG. 15.

FIG. 16 shows a further development of the cover arrangement in FIG. 15. More specifically, FIG. 16 discloses a four-sided frame. A further elongated support member 90 is arranged below the window and an associated plate-shaped cover is connected to the elongated support member 90 in a similar manner as has been described above so that a gap is formed for receipt of a lower edge of the covering. Thus, the connection between the elongated support member and the plate-shaped cover provides for arranging the plate-shaped cover in an up-side-down position in relation to the cover arrangement on top of the window.

Figure 17:
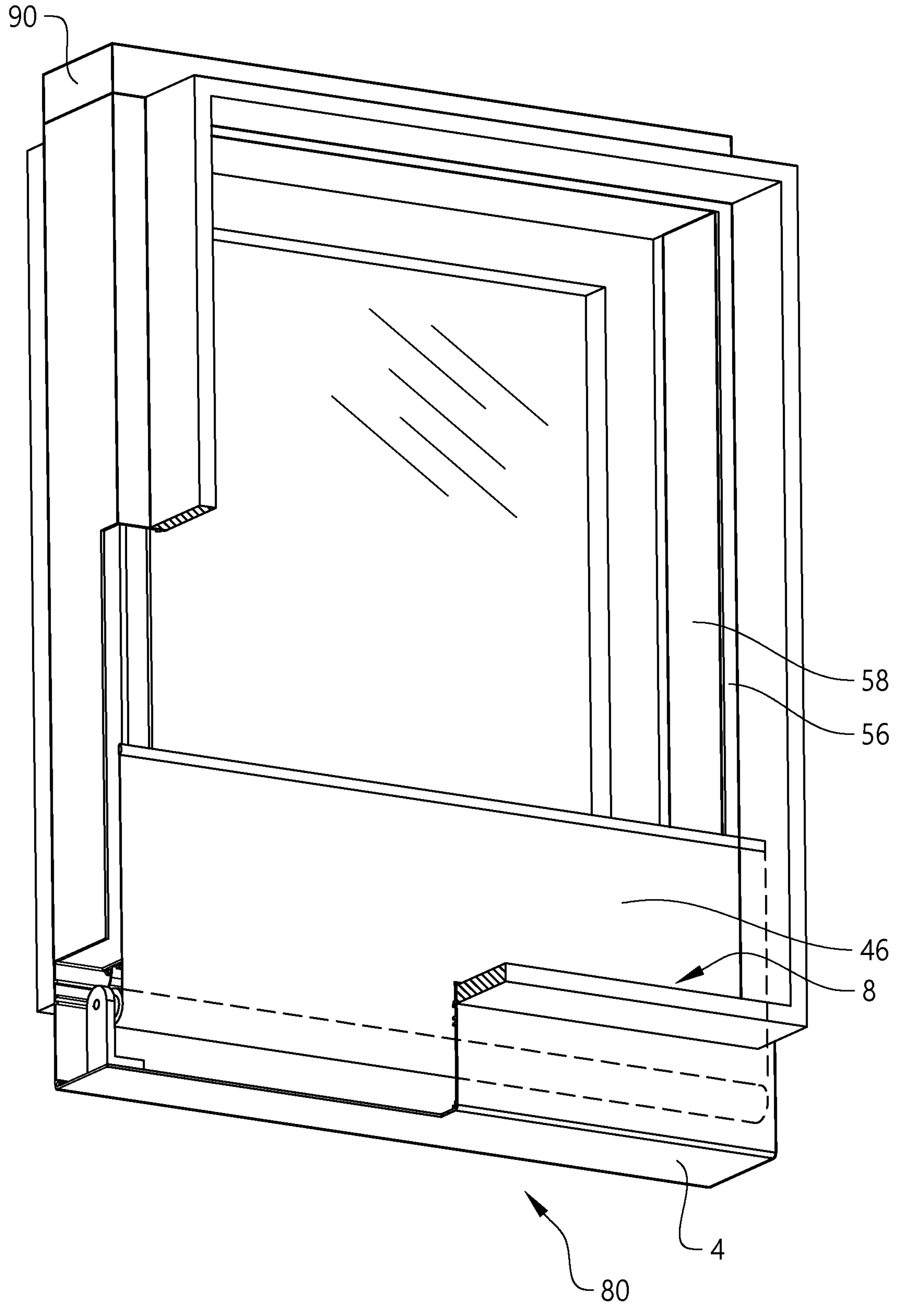
FIG. 17 shows an alternative embodiment to the one in FIG. 16, FIGS. 18*a* and 18*b* show a step during mounting of a covering in a cover arrangement.

FIG. 17 shows an alternative embodiment to the one in FIG. 16. More specifically, a covering in the form of a blind is arranged in an elongated support member in a position below a window for travelling upwards when extended. More specifically, the elongated support member may be arranged in a floor, window sill or glazing bar.

Figure 18A:
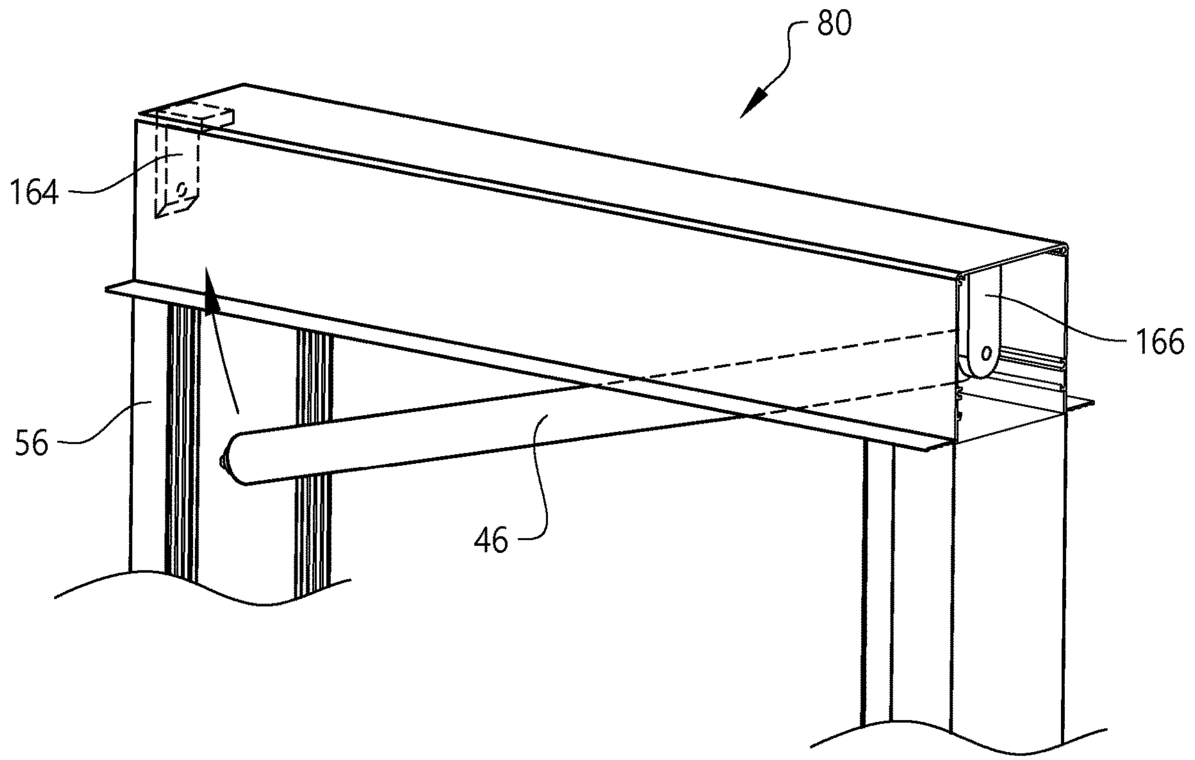
Figure 18B:
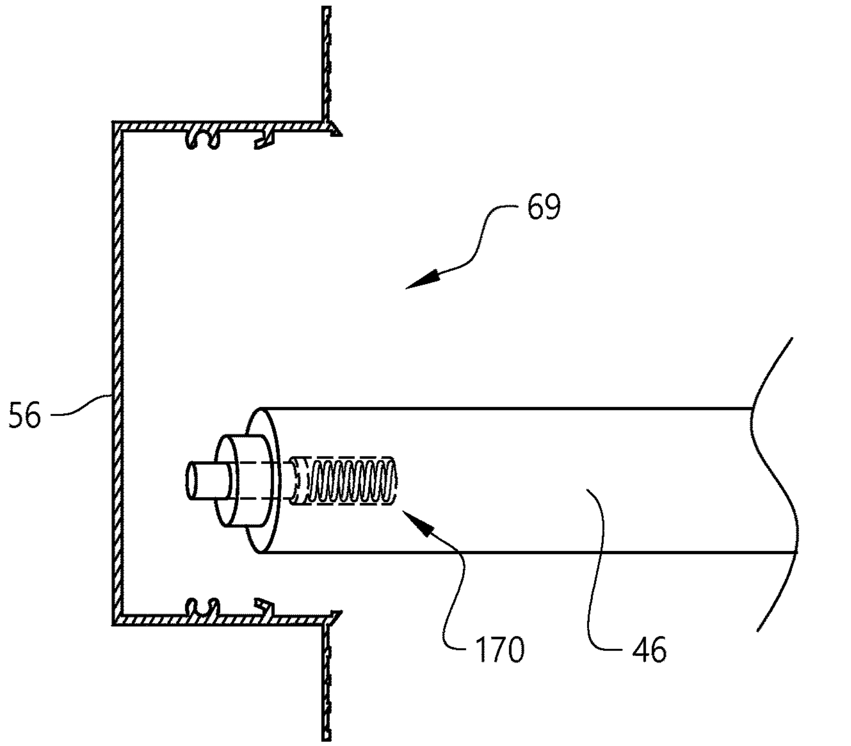

FIG. 18*a* and FIG. 18*b* show a step of mounting the covering 46 to the cover arrangement 80 according to FIG. 15. The cover arrangement comprises at least one means 164,166 for holding the extendable covering 46. In a first step, the holding means 164,166 for the covering 46 are mounted to the upper elongated support member 4 (and/or to the wall portion). Further, the covering 46, which is rolled onto a roll, is first engaged with one end in one of the holding means 166 in an inclined state and then pivoted so that the other end is engaged with the other holding means 164. The lateral elongated support member 56 has a shape allowing an end of the covering 46 to project into its elongated aperture 69. Further, the covering 46 may have a spring biased mechanism 170 at the other end for engaging the associated mounting.

The at least one means 164,166 for holding the extendable covering 46 may be provided in the cover arrangement 80 before it is installed in the wall or roof portion, or alternatively be arranged at a later stage when it is decided to use the cover arrangement 80 for a covering solution. Further, the cover arrangement 80 allows for installing different types of coverings 46 and associated holding means 164, 166. Further, the cover arrangement 80 allows for installing a single covering or a plurality of coverings 46. The holding means 164,166 may be formed by brackets.

Figure 19:
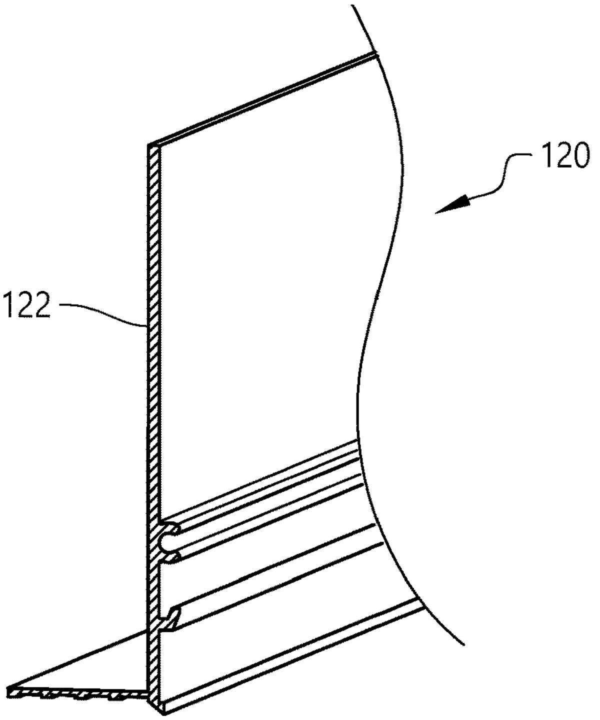
FIGS. 19 and 20 are perspective cut views of two embodiments of an elongated support member.

FIG. 19 is a perspective cut view of a further embodiment of an elongated support member 120. The elongated support member 120 comprises a single plate-shaped portion 122 comprising the first engagement means as has been described above. The elongated support member 120 may be fastened to the wall or roof via the first plate 122 in a similar fashion as has been described above.

Figure 20:
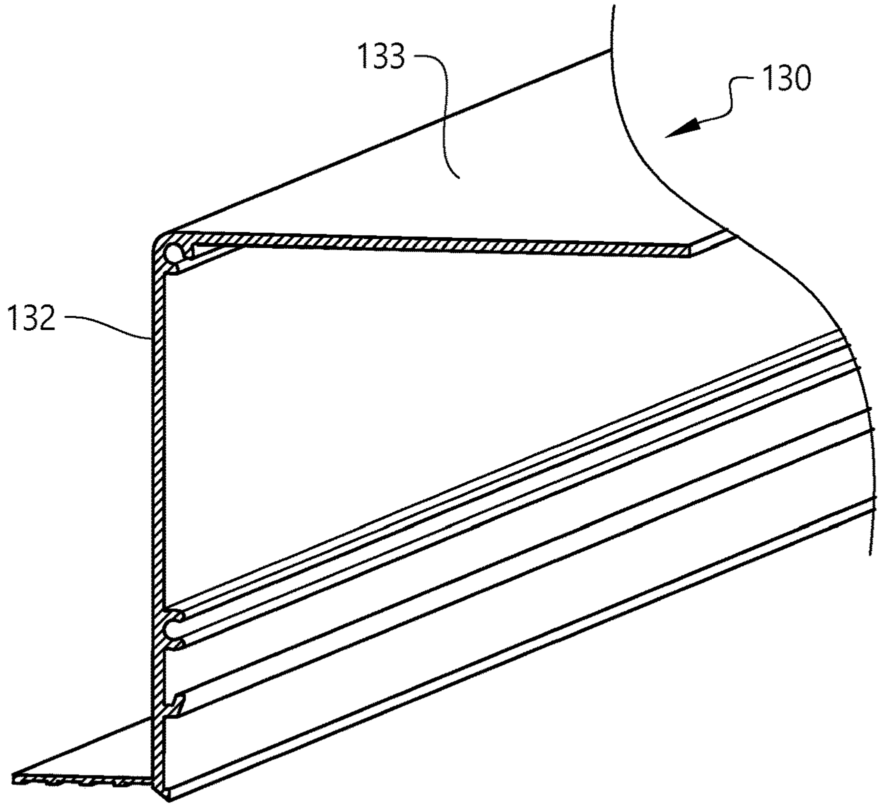

FIG. 20 is a perspective cut view of a further embodiment of an elongated support member 130. The elongated support member 130 comprises a first plate-shaped portion 132 and a second plate-shaped portion 133 arranged perpendicularly to the first plate-shaped portion 132. The first plate-shaped portion 132 and the second plate-shaped portion 133 are formed in a one-piece unit. The first plate-shaped portion 132 comprising the first engagement means as has been described above. The elongated support member 120 may be fastened to the wall or roof via the second plate-shaped portion 133 in a similar fashion as has been described above.

Figure 21:
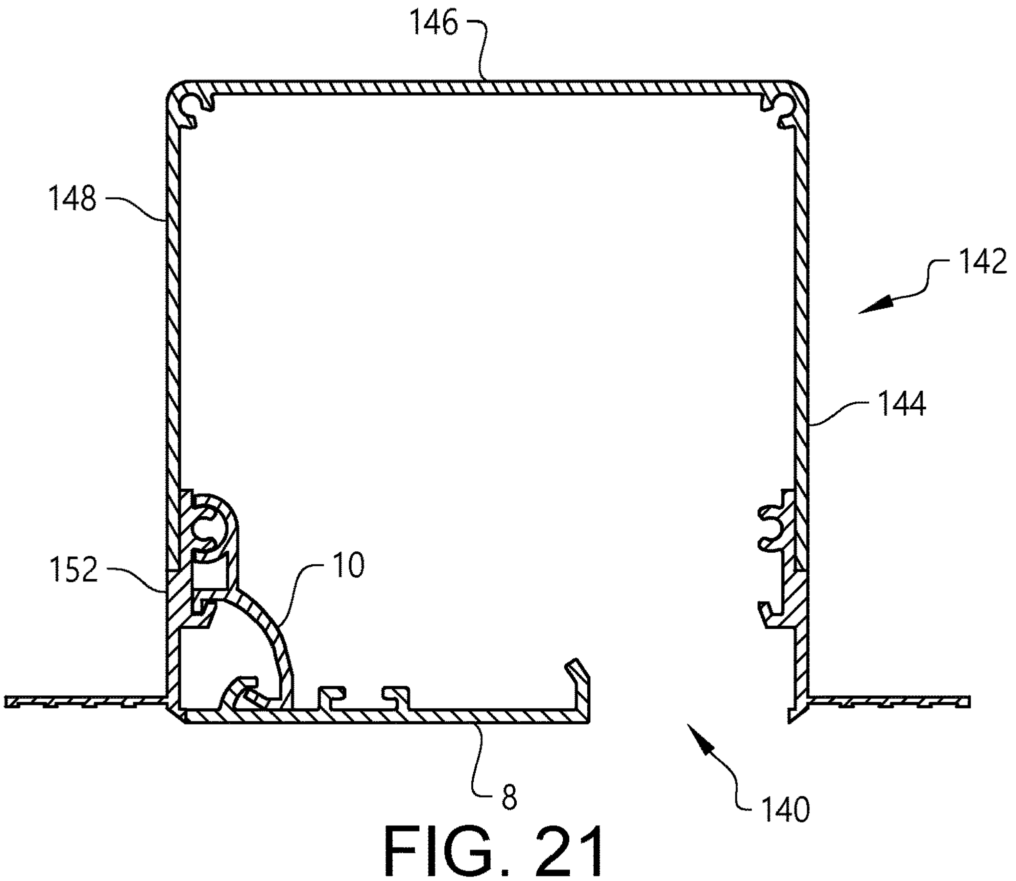
FIGS. 21 and 22 are cross sectional views of a cover arrangement according to two further embodiments.

FIG. 21 is a cross section view of a cover arrangement 140 according to a further embodiment. More specifically, it is a variant of the cover arrangement 2 according to the first embodiment. The cover arrangement 140 comprises an elongated housing 142. The elongated housing 142 comprises a first plate-shaped portion 148, a second plate-shaped portion 146 arranged perpendicularly to the first plate-shaped portion 148 and a third plate-shaped portion 144 arranged in parallel with the first plate-shaped portion 148. The third plate-shaped portion 144, the second plate-shaped portion 146 and the first plate-shaped portion 148 are formed in a one-piece unit.

An elongated support member 152 is attached to a long side edge of the first plate-shaped portion 148. The elongated support member 152 comprises two plate sections in a one-piece unit, wherein the plate sections are parallel and displaced relative to one another for achieving an overlapping relationship with the plate-shaped portion 148. The support member 152 comprises the first engagement means as has been described above. The two parts 148,152 have overlapping sections and are firmly joined, such as via a rivet connection (not shown). Thus, this embodiment provides for manufacturing housings of relatively cost-efficient designs and of dimensions for specific applications and attach the elongated support member at a longitudinal edge of a wall of the housing.

Figure 22:
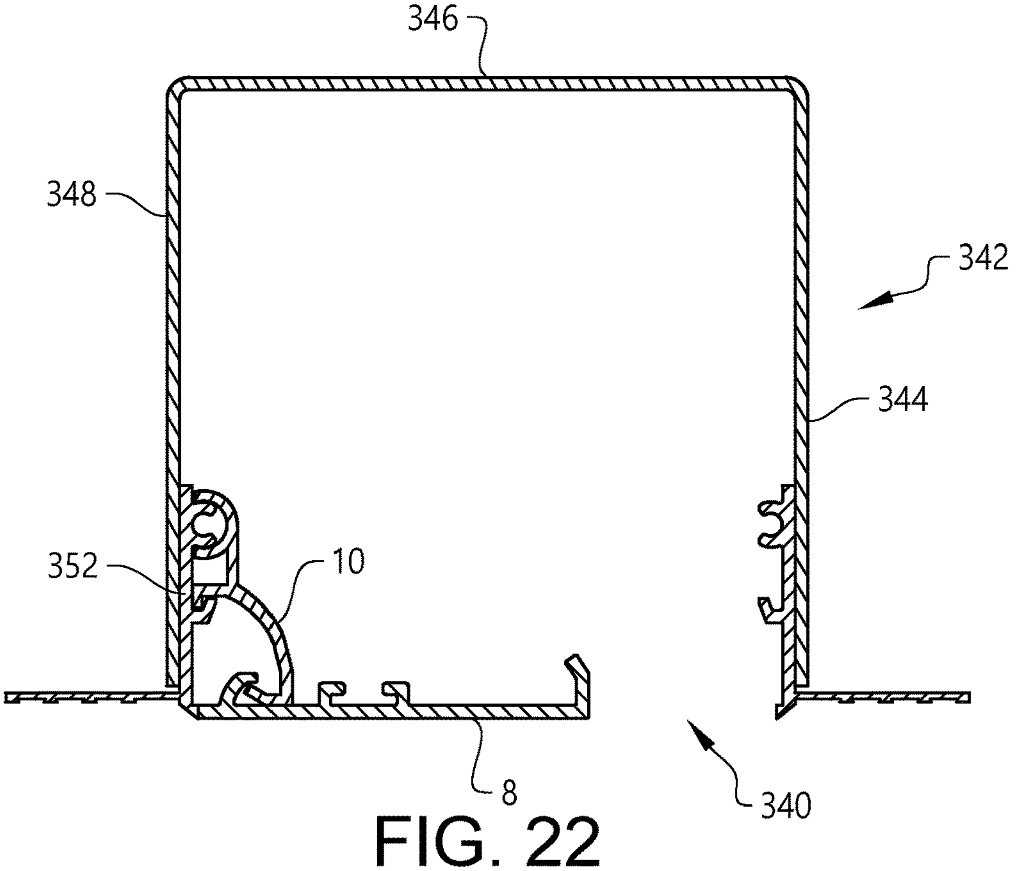

FIG. 22 is a cross section view of a cover arrangement according to an alternative to the cover arrangement in FIG. 21. The cover arrangement 340 comprises an elongated housing 342. The elongated housing 342 comprises a first plate-shaped portion 348, a second plate-shaped portion 346 arranged perpendicularly to the first plate-shaped portion 348 and a third plate-shaped portion 344 arranged in parallel with the first plate-shaped portion 348. One difference in relation to FIG. 21 is that the elongated support member 352 comprises a single plate section, which is arranged in parallel with and on the interior side of the first plate-shaped portion 348. According to one example, the elongated support member 352 may be firmly joined to the first plate-shaped portion 348 via an adhesive, such as via an adhesive tape.

Figure 23:
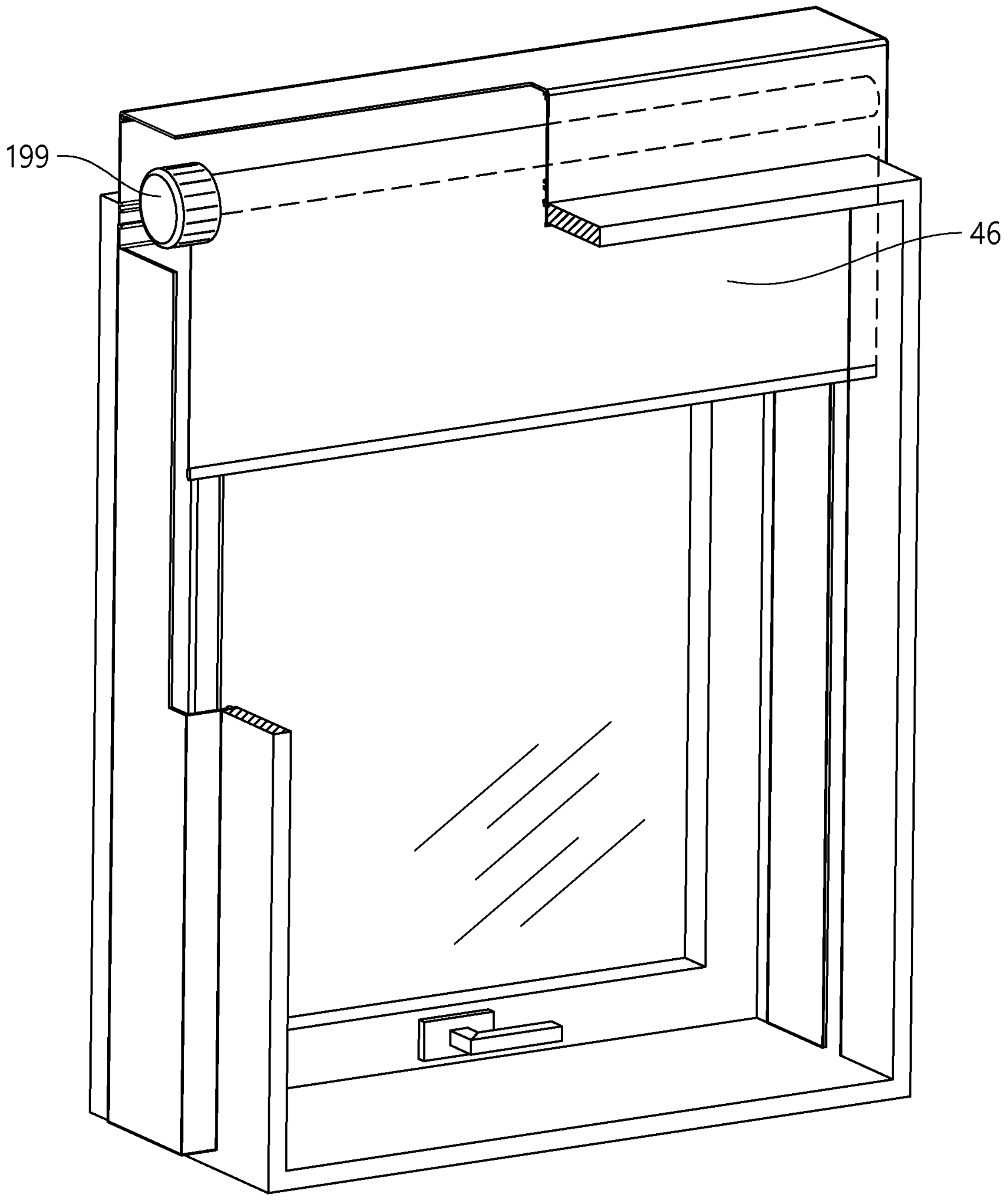
FIG. 23 shows a cover arrangement with a motorized covering applied.

FIG. 23 discloses that the cover arrangement may comprise a motor 199 for operating the covering(s) 46 between the retracted state and the extended state.

Figure 24:
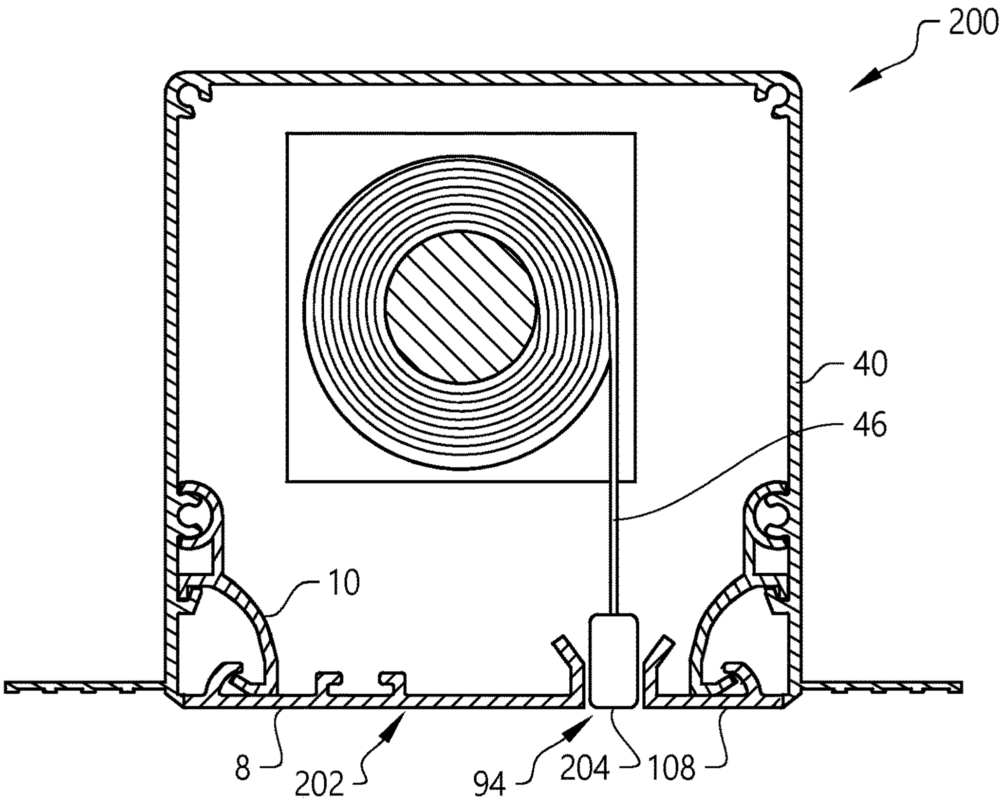
FIGS. 24 and 25 show two further embodiments of a cover arrangement in cross section views.

FIG. 24 shows a cover arrangement 200 according to a further embodiment forming an alternative to the cover arrangement 2 according to the first embodiment shown in FIG. 1-2. The cover arrangement 200 is shown in cross section with a covering 46 applied. The cover arrangement 200 comprises a closing structure 202, which in turn comprises an elongated cover member 204, which is attached to an edge of the covering 46. The cover arrangement 200 comprise two elongated plate-shaped covers 8, 108, one from each side. Further, the elongated cover member 204 and the elongated plate-shaped covers being designed so that the elongated cover member 204 at least substantially blocks a passage for the covering passed the two elongated plate-shaped covers when the covering is in the retracted state. The elongated cover member 204 has an exterior shape and dimension matching the adjacent parts of the elongated cover 8 and the support member defining the slot 94.

Figure 25:
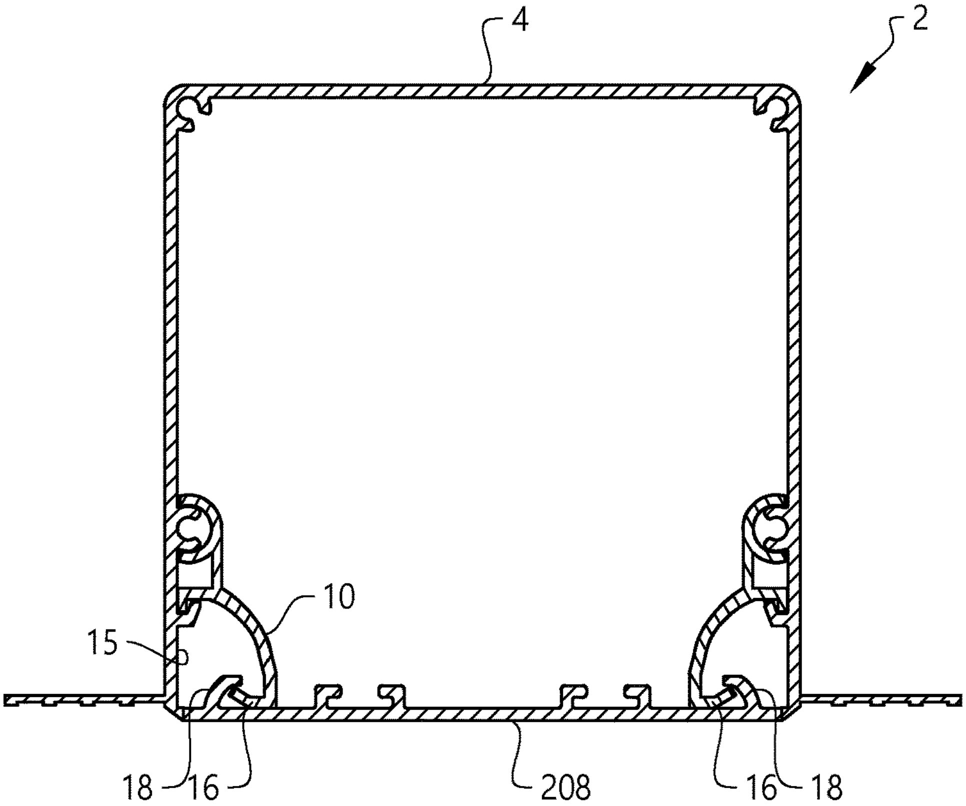

FIG. 25 shows a further alternative of a cover arrangement. The cover arrangement comprises a series of connection elements at either side of the housing. Further, a single elongated plate-shaped cover 208 comprises pivot means at both opposite longitudinal edges for engagement with the associated pivot means of the connection elements.

Figure 26:
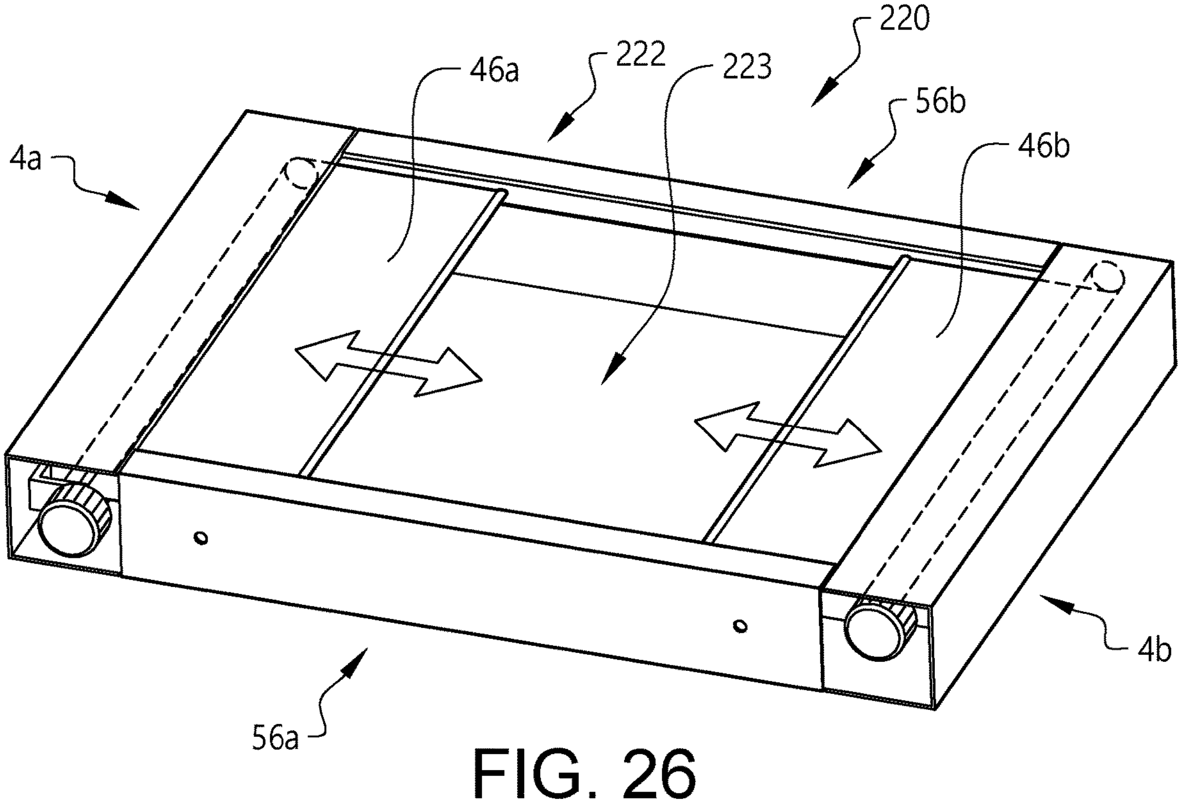
FIG. 26 shows a cover arrangement applied in a roof opening according to a first embodiment.

FIG. 26 shows a roof portion 220 comprising a cover arrangement 222 according to a further embodiment. It is a so called skylight design. The cover arrangement 222 is an alternative to the cover arrangement according to FIG. 21. Only the main differences will be described below. The cover arrangement 222 comprises a further elongated support member **4*b* accommodating a further covering 46*b* arranged opposite the elongated support member 4*a* accommodating the covering 46*a* in relation to a window opening 223 so that the apertures for the coverings 46*a*, 46*b* face each other. In other words, the cover arrangement 222 forms a frame with a rectangular shape, wherein the cover arrangement 222 extends along all four sides of the rectangle. According to the example in FIG. 26, the two coverings 46*a*, 46*b* extend along the same slot in the sideways cover arrangements. Thus, the facing edges of the two coverings 46*a*. 46*b* may meet when the coverings jointly cover the window opening. According to an alternative, the sideways cover arrangements are provided with two slots, one for each covering 46*a*, 46*b***, so that each covering may extend for completely covering the roof opening.

Figure 27:
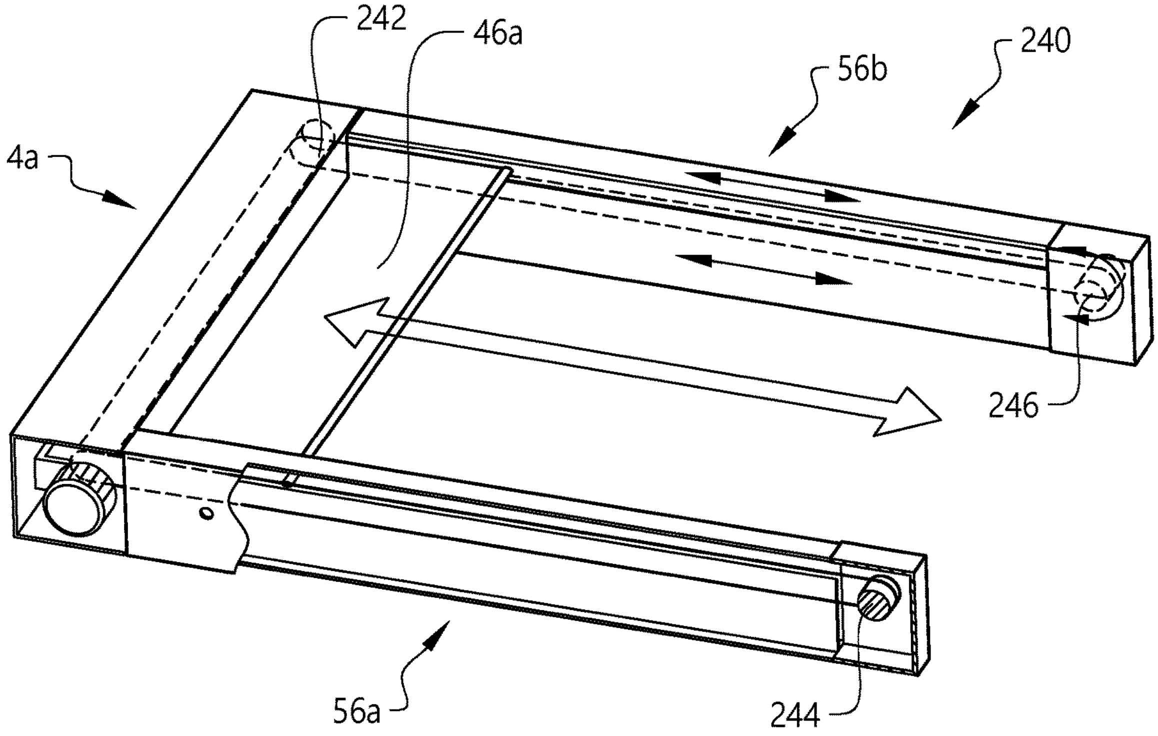
FIG. 27 shows a cover arrangement according to an alternative to FIG. 23, FIGS. 28 and 29 show an alternative design of a covering for the support arrangement in two different states.

FIG. 27 shows an alternative cover arrangement 240 similar to the one shown in FIG. 26, but without the further elongated support member **4*b* for accommodating a further covering 46*b*. More specifically, the covering 46*a* is rolled on a roll 242 rotatably arranged inside the associated elongated support member. A roll member 244, 246 is arranged at an opposite end of each one of the sideways elongated support members, wherein a cord from the roll forms a loop around its associated roll member 244,246. The covering 46*a*** is attached to the cords for extension and retraction along the cord extension.

Figure 28:
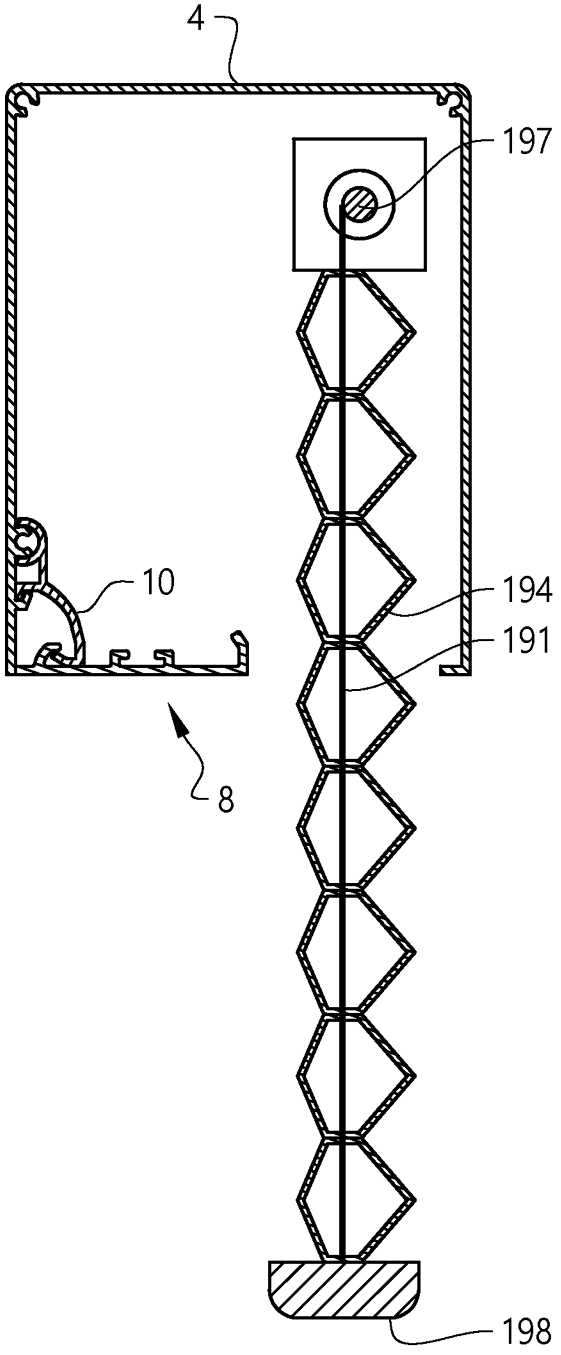
Figure 29:
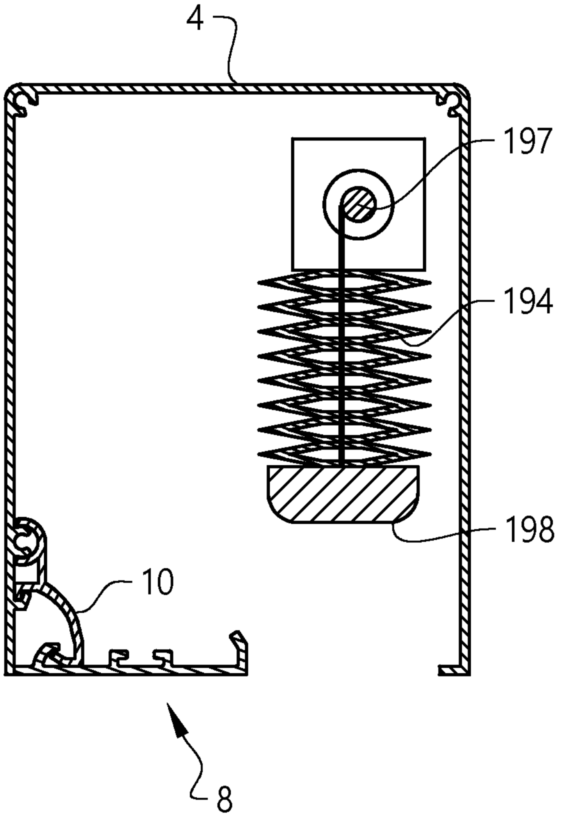

FIG. 28-29 show an alternative type of covering 194 for being used in association with the cover arrangement. More specifically, the covering 194 is adapted to be arranged in a compressed state in the retracted state, see FIG. 28, and in an extended state, see FIG. 29. More specifically, the covering 194 is foldable and is folded in the compressed state. The covering 194 may be formed by a fabric and may define a hollow structure. More specifically, covering 194 may be formed by a single wall structure or a double wall structure as seen in the figure. The fabric is held together by cords 191 that run through the material. Further, a roll 197 is arranged inside the elongated support member, wherein the cords 191 are attached at one end to the roll and to a cross bar 198 at the other end, wherein the cross bar compresses the fabric when the roll is turned in a first direction and extends the fabric when the roll is turned in the other direction.

FIG. **30*a*-*g* show different stages of assembly of a cover arrangement 302 according to a further embodiment in partly cut, perspective views. For ease of presentation, only the main differences of the design and function in relation to the cover arrangement 2 and its associated assembly according to FIG. 1-7*e*** will be described below.

The cover arrangement 302 comprises an elongated support member 304 (which is shown in a view cut with regard to its length), a plate-shaped cover 308 (which is shown in a view cut with regard to its length) and a connection element 310.

The elongated support member 304 comprises an elongated back plate 340 and two spaced elongated side plates 313, 344 forming a U-shape in cross section. Each one of the back plate 340 and the two spaced elongated side plates 313, 344 is planar. More specifically, each one of the two spaced elongated side plates 313, 344 extend perpendicularly relative to the back plate 340.

Each one of the connection element 310 and the elongated support member 304 comprises complimentary shaped first engagement means 312,314 so that the connection element 310 may be rigidly connected to the elongated support member 304 in an operative state. More specifically, the first engagement means 312 of the elongated support member 304 is arranged on an internal wall of each one of the two spaced elongated side plates 313, 344.

The first engagement means 312 of the elongated support member 304 comprises one single first projecting engagement portion 320. The first projecting engagement portion 320 forms a male structure. More specifically, the first projecting engagement portion 320 forms a rib with an inclined or rounded external surface. More specifically, the first projecting engagement portion 320 extends along a circle of an arc. More specifically, the first projecting engagement portion 320 has an extension of about 180° of a circle. More specifically, the first projecting engagement portion 320 extends towards the back plate 340 so that a free end of the first projecting engagement portion 320 faces the back plate 340.

The first engagement means 314 of the connection element 310 comprises two spaced first projecting engagement portions 322, 322'. The two spaced first projecting engagement portions 322,322' jointly form a female structure, which is complimentary in relation to the male structure. Each one of the first projecting engagement portions 322, 322' forms a rib with an inclined or rounded internal surface so that they jointly are complimentary to the shape and dimension of the associated single projecting engagement portion 320 of the elongated support member 304. More specifically, a lower one 322' of the first projecting engagement portions 322,322' has a longer extension than an upper one 322 of the first projecting engagement portions 322,322', wherein the lower one 322' will be arranged closer to the side wall 313 than the upper one 322 when the connection element 310 is in an operative state relative to the elongated support member 304, see FIG. 31.

Thanks to the elasticity of the connection element 310, the connection element 310 may be snapped in place relative to the elongated support member 304 when the complimentary shaped first engagement means 312,314 are engaged.

Further, the connection element 310 and the plate-shaped cover 308 comprises complimentary shaped pivot means 316,318 so that the plate-shaped cover 308 may be pivoted between a non-connected state and a connected state in relation to the elongated support member 304 when the connection element 310 is in its operative state in relation to the elongated support member.

Further, the elongated support member 304 and the plate-shaped cover 308 comprises complimentary shaped second engagement means 328,330 for fixing the plate-shaped cover 308 in the connected state in relation to the elongated support member 304. The second engagement means 328 of the elongated support member 304 is formed by an elongated recess 332 defined between two elongated projections 333, 335 projecting from an interior surface of the side wall 313 and extending in parallel with a longitudinal direction of the elongated support member 304. The elongated projections 333, 335 are arranged in the vicinity of an edge of the side wall 313.

The second engagement means 330 of the plate-shaped cover 308 is formed by a free edge surface of an edge 325 of the plate-shaped cover 308. More specifically, the edge 325 is displaced a distance upwards from a lower surface 327 of the plate-shaped cover 308 so that the lower surface 327 is flush with a lower surface 329 of the edge of the side wall 313.

Thanks to the elasticity of the connection element 310 and the design of the pivot means 316,318, the plate-shaped cover 308 will be pushed against the elongated support member 304 during assembly, wherein the edge 325 of the plate-shaped cover 308 will slide over the upper elongated projection 333 and snapped in place in the elongated recess 332, wherein the second engagement means 328,330 will be engaged.

The connection element 310 further comprises a positioning portion 334 adapted for engaging a complimentary shaped portion 336 of the elongated support member 304 for positioning the connection element 310 relative to the elongated support member 304 during engagement of the first engagement means 312,314.

Figure 30A:
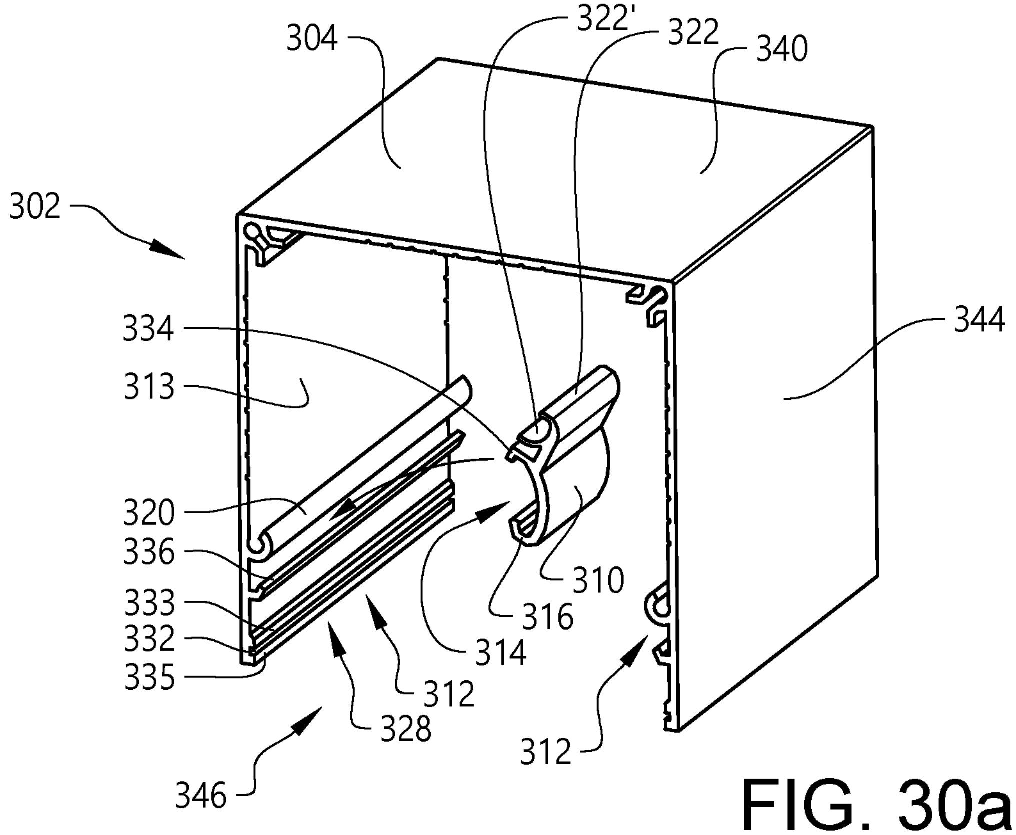
FIG. 30*a-g* show different stages of assembly of a cover arrangement according to a further embodiment in partly cut, perspective views.

In FIG. 30*a*, the elongated support member 304 is arranged in an operative state, wherein an opening 346 between the side walls 313,344 is open downwards. The connection element 310 is held by an operator (not shown) in an inclined state between the side walls 313,344 facilitating engagement between the complimentary shaped positioning portions 334,336. In a next step, the connection element 310 will be moved towards the side wall 313 so that the complimentary shaped positioning portions 334,336 engage each other, see arrow.

Figure 30B:
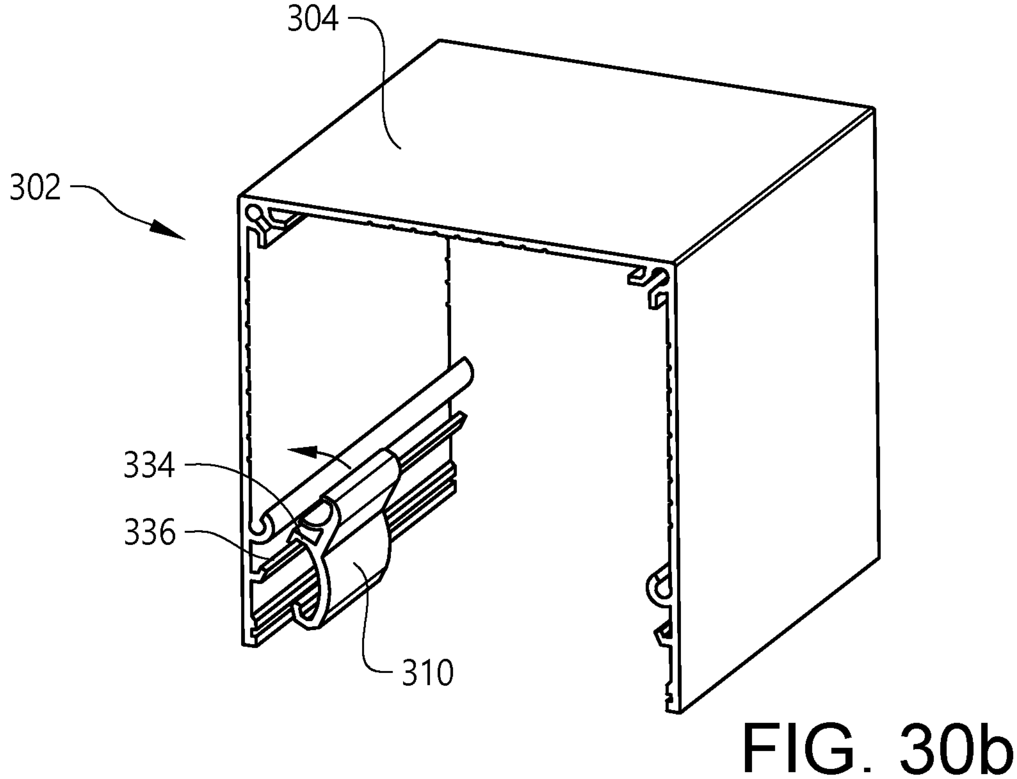

In FIG. 30*b*, connection element 310 is pivoted from the state shown in FIG. 30*a* relative to the elongated support member 304 while the positioning portions 334,336 are in engagement so that the complimentary shaped first engagement means 312,314 engage, see arrow. The snapping in of the complimentary shaped first engagement means 312,314 may be associated to a click, which provides feedback to the operator of a correct assembly.

Figure 30C:
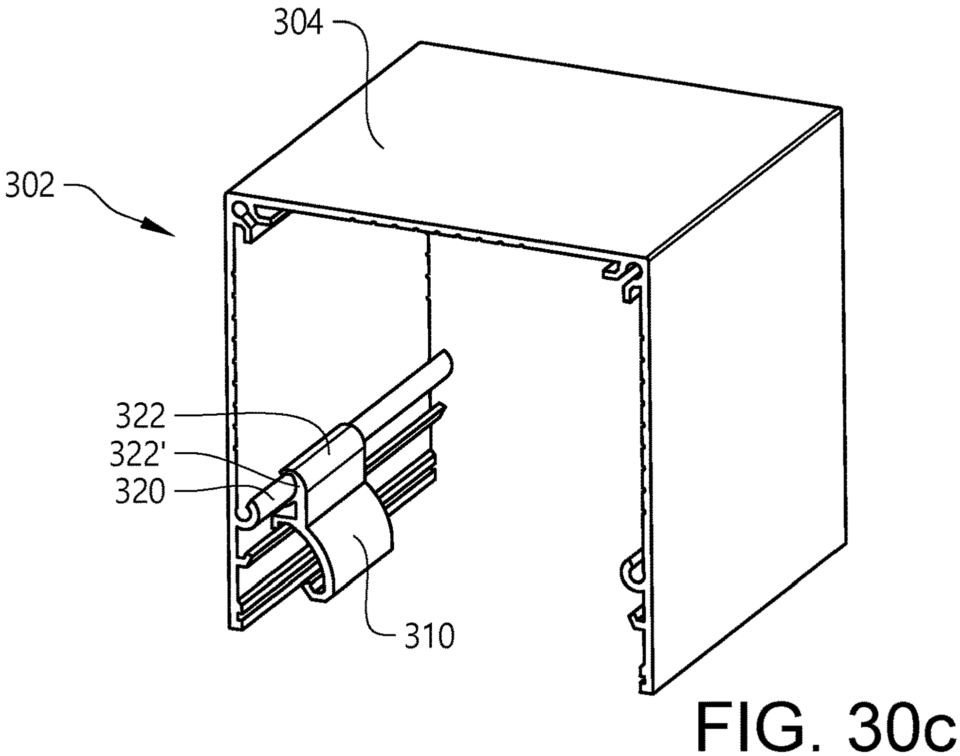

In FIG. 30*c*, the connection element 310 is shown in an operative state relative to the elongated support member 304.

Figure 30D:
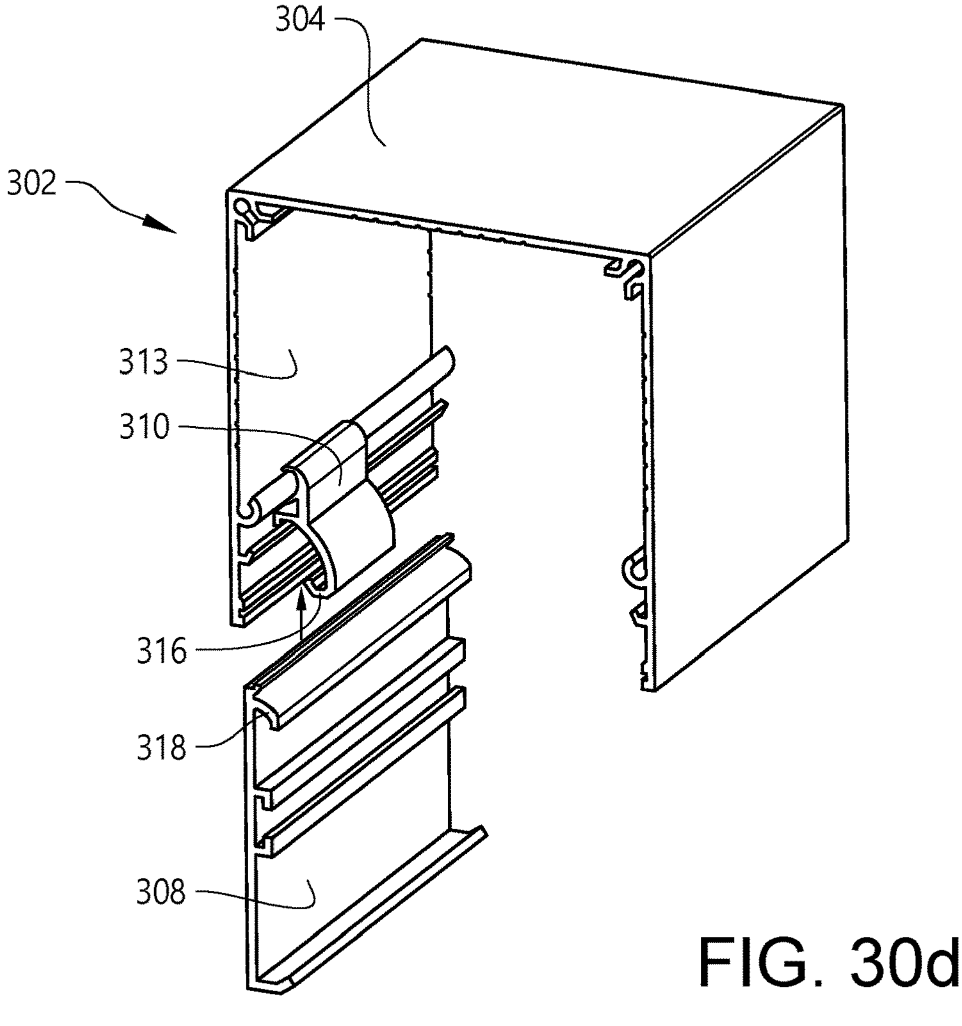

In FIG. 30*d*, the plate-shaped cover 308 is moved relative to the elongated support member 304 so that a longitudinal side edge of the elongated plate-shaped cover 308 is introduced in the spacing between the pivot means 316 of the connection element 310 and the adjacent inner surface of the side wall 313 of the elongated support member 304, see arrow. Further, the elongated plate-shaped cover 308 is moved in this direction until the pivot means 318 of the plate-shaped cover 308 has passed the pivot means 316 of the connection element 310.

In a next step (not shown), the elongated plate-shaped cover 308 is moved away from the side wall 313 of the elongated support member 304 so that the pivot means 316,318 engage each other.

Figure 30E:
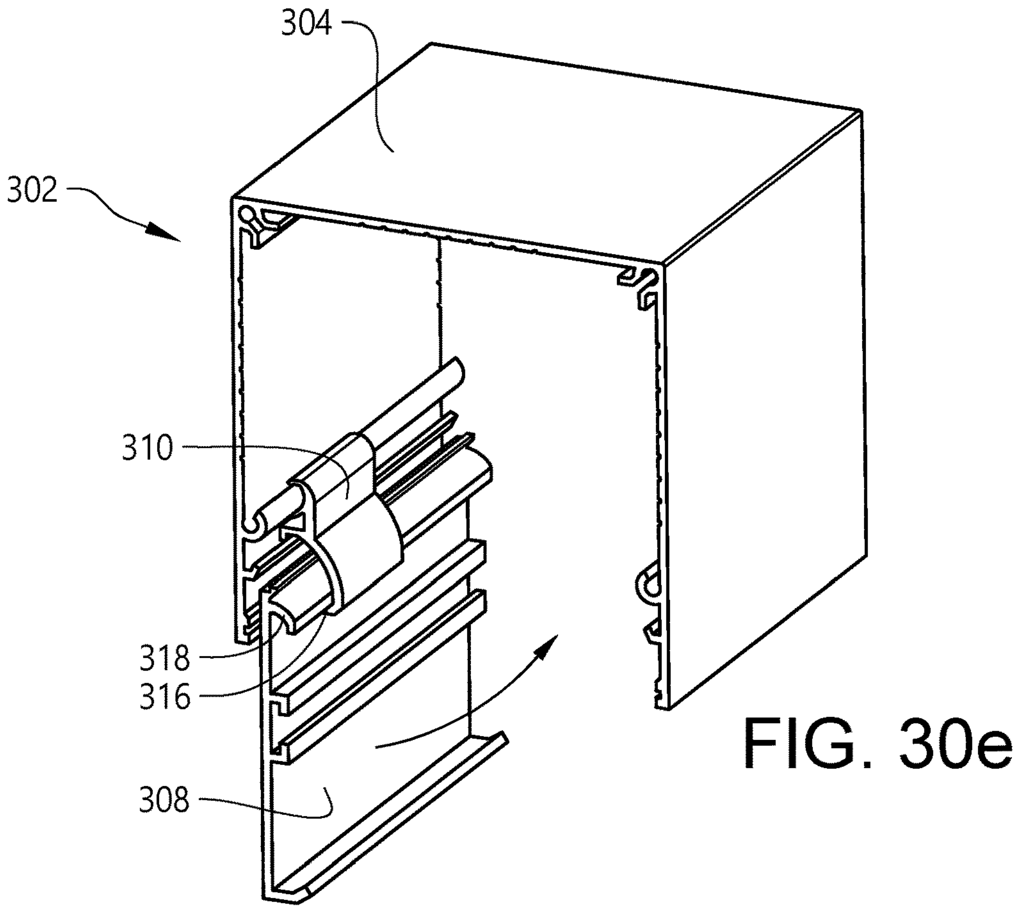

The elongated plate-shaped cover 308 now hangs on the elongated support member 304 via the pivot means 316,318, see FIG. 30*e*. In a next step, the elongated plate-shaped cover 308 is pivoted relative to the elongated support member 304 via the pivot means 316,318 towards an operative state, see arrow in FIG. 30*e*.

Figure 30F:
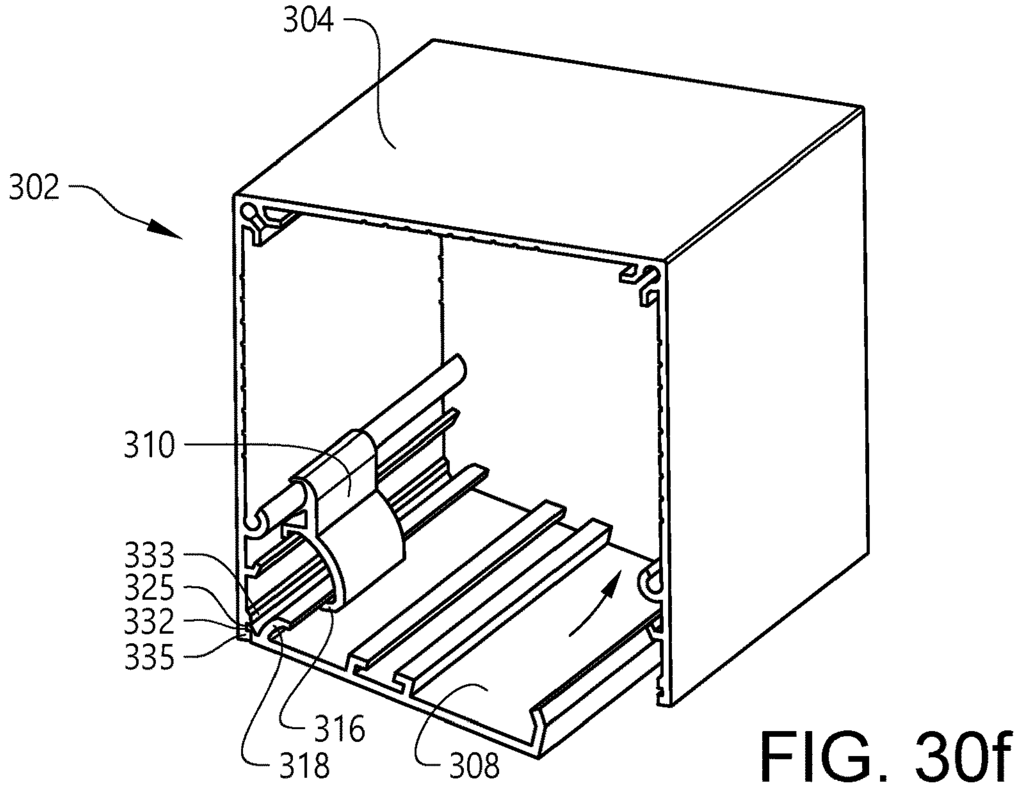

More specifically, the elongated plate-shaped cover 308 is pivoted relative to the elongated support member 304 via the pivot means 316,318 so that the edge 325 of the plate-shaped cover 308 passes over the upper elongated projection 333, see arrow in FIG. 30*f*, wherein the connection element 310 will be elastically deformed and the edge 325 of the plate-shaped cover 308 will be snapped in place in the elongated recess 332, wherein the second engagement means 328,330 will be engaged. The snapping in of the complimentary shaped second engagement means 328,330 may be associated to a click, which provides feedback to the operator of a correct assembly.

Figure 30G:
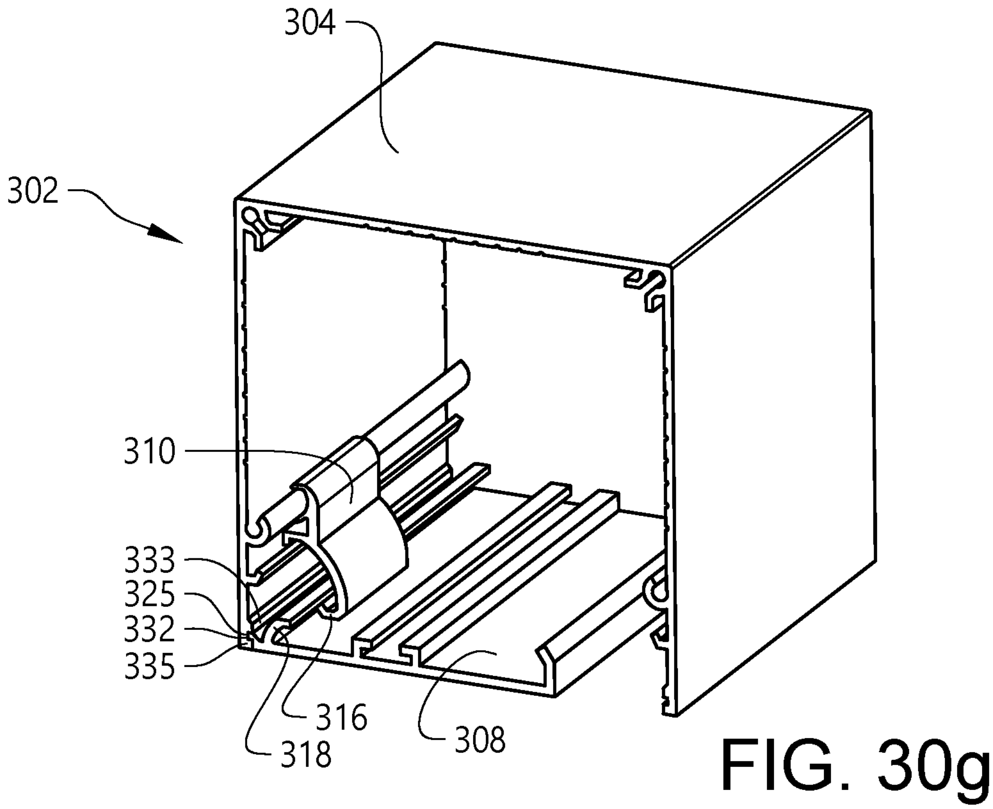
Figure 31:
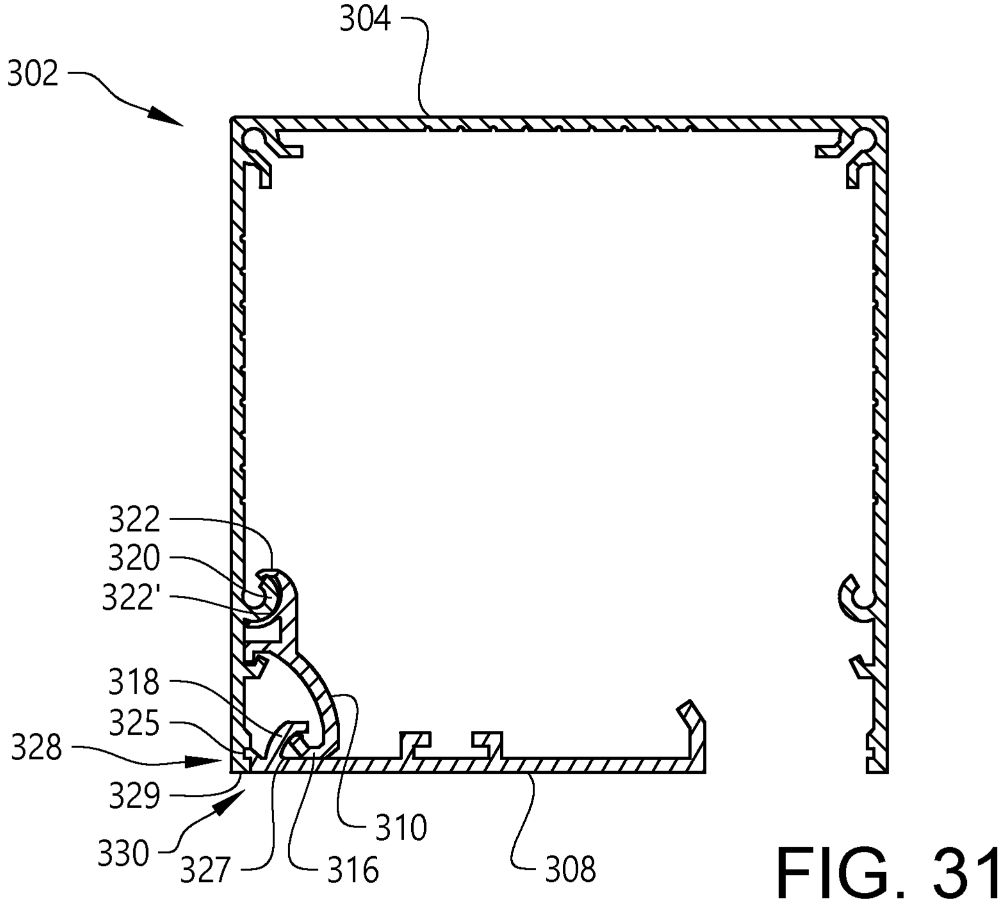
FIG. 31 shows the cover arrangement according to FIG. 30*g* in a cross section view.

In FIG. 30*g*, the elongated plate-shaped cover 308 is arranged in an operative state relative to the elongated support member 304. FIG. 31 shows the cover arrangement according to FIG. 30*g* in a cross section view.

Figure 32A:
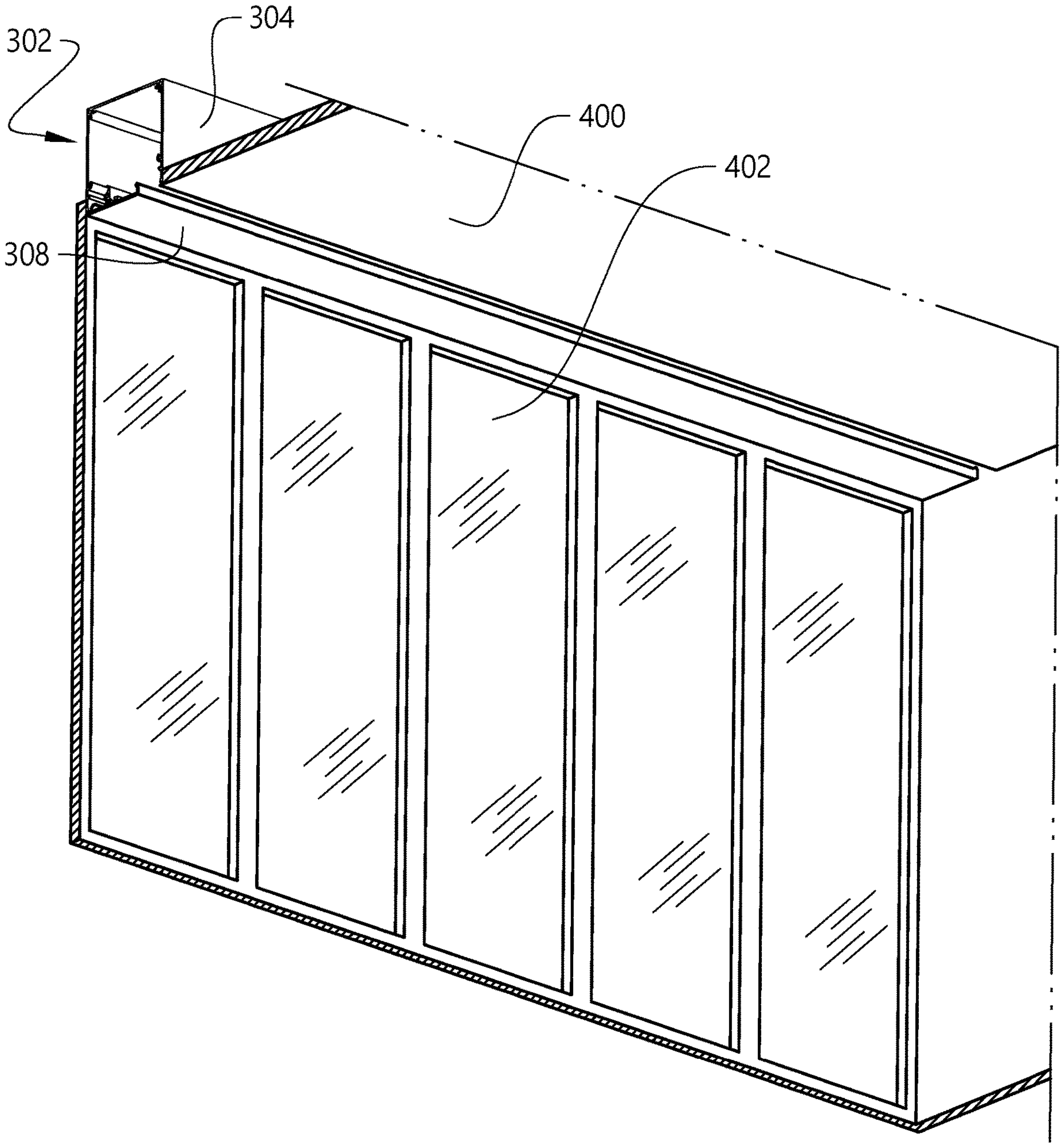
FIG. 32*a* shows the cover arrangement according to FIG. 30*g* in a perspective view in a recessed application associated to a window application.

FIG. 32*a* shows the cover arrangement 302 according to FIG. 30*g* in a perspective view in a recessed application in a ceiling 400 above a window 402. More specifically, the elongated support member 304 is positioned in its entirety in an elongated opening in the ceiling so that the elongated plate-shaped cover 308 is arranged flush with an internal surface of the ceiling. It may be noted that the elongated support member 304 is several meters long and in one example six meter long, wherein it may be heavy and requires a facilitated assembly.

Figure 32B:
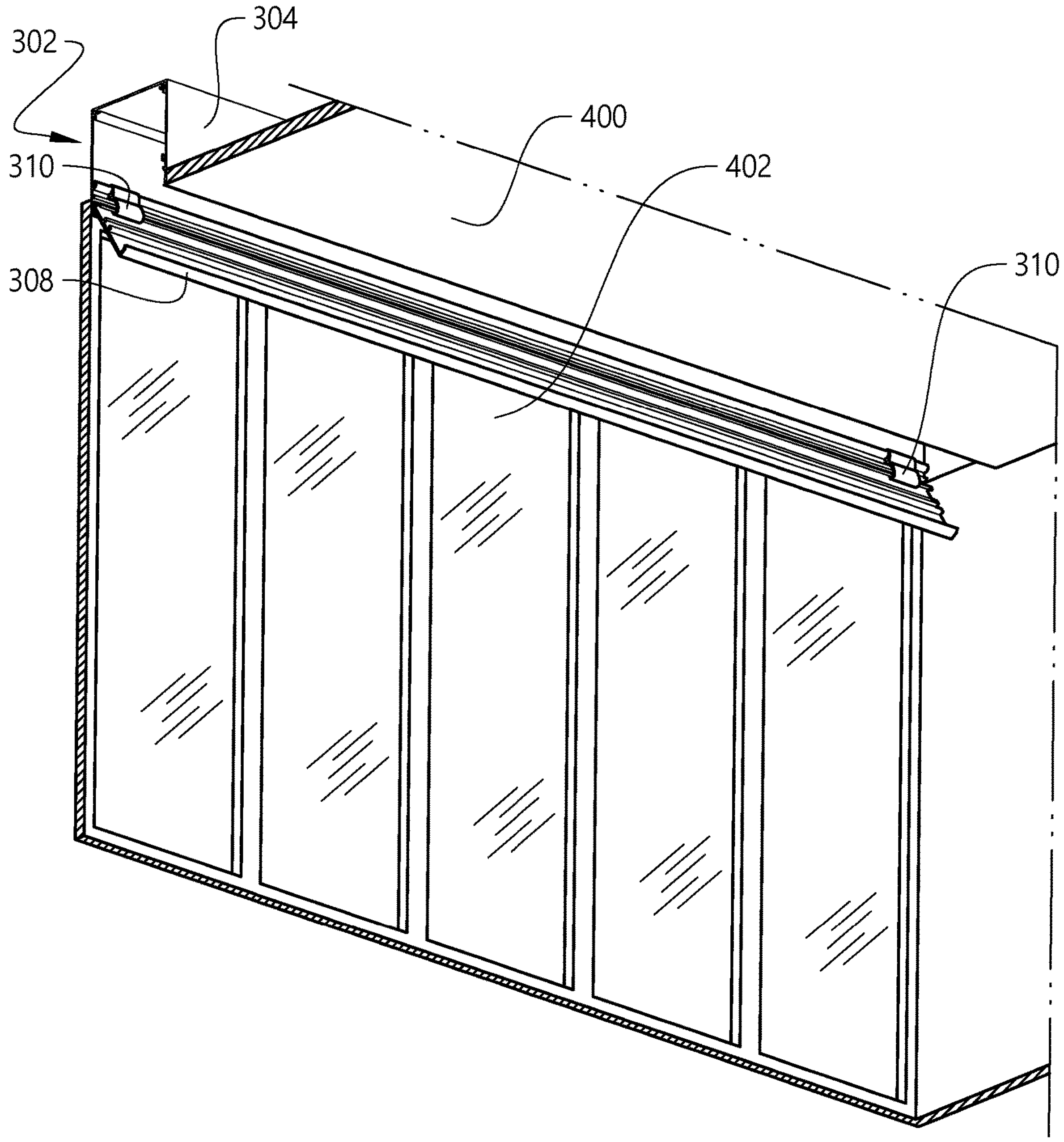
FIG. 32*b* and FIG. 32*c* show consecutive assembly steps of the cover arrangement in FIG. 32*a*.
Figure 32C:
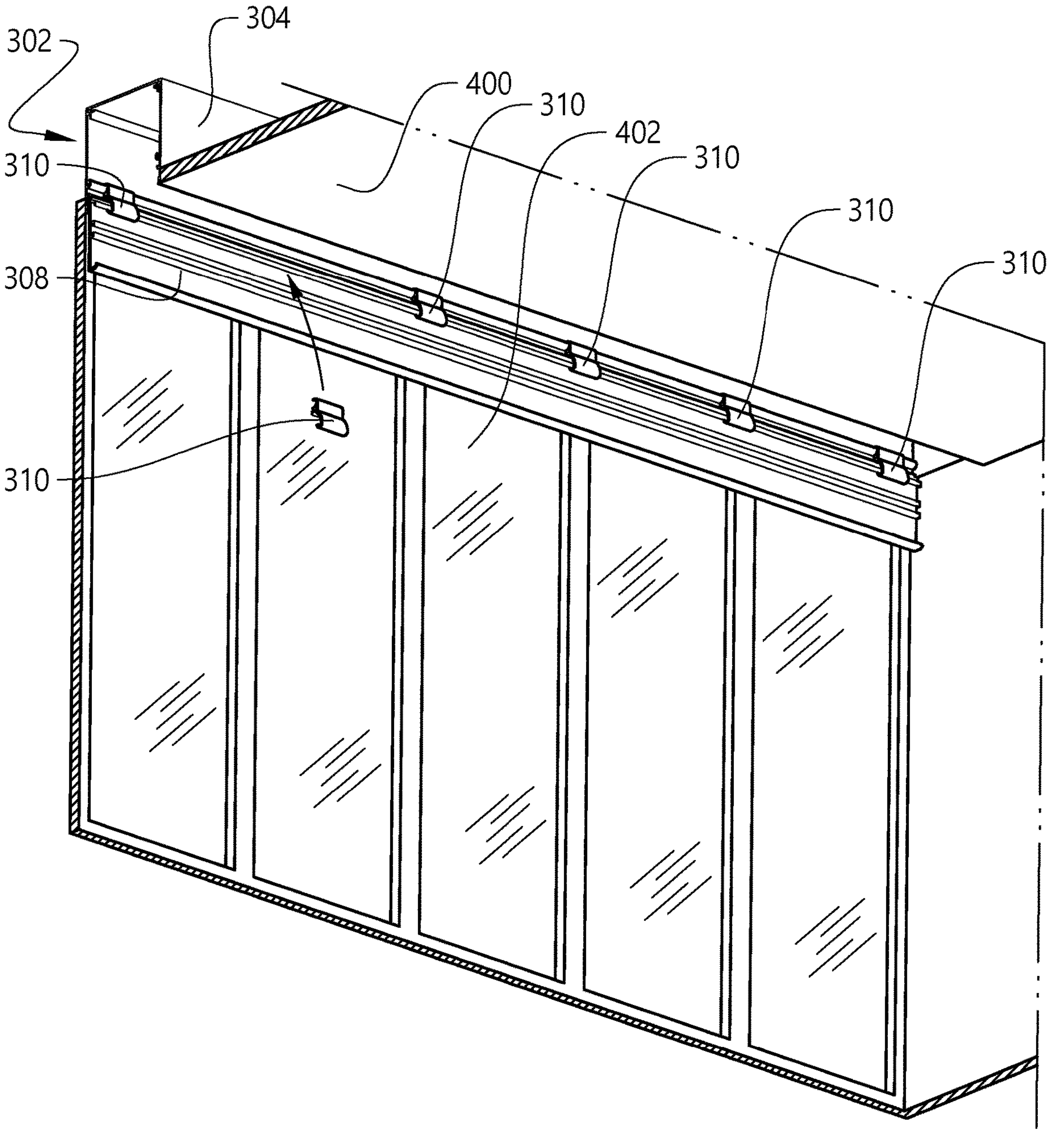

FIG. 32*b* shows an intermediate assembly step, wherein a connection element 310 is arranged at each end of the elongated support member 304. Further, the elongated plate-shaped cover 308 is connected to the two connection elements 310 so thatit hangs on the two hooks of the pivot means 316,318. An operator may then click-in more connection elements 310 along the length of elongated support member 304 between the two first ones, see FIG. 32*b*, while the elongated plate-shaped cover 308 hangs on the two first ones. In this way an operator can decide by the number of connection elements 310, how hard the elongated plate-shaped cover 308 should close.

It is to be understood that the present invention is not limited to the embodiments described above and illustrated in the drawings; rather, the skilled person will recognize that many changes and modifications may be made within the scope of the appended claims.

Even though the cover arrangements according to the first and second embodiments in FIGS. 1-6 and 8-9 have been described for a joint application in FIG. 10, it should not be regarded as limiting example. Instead, each one of the cover arrangements according to the first and second embodiments may be used separately or in other combinations with each other. Further, the cover arrangement may be arranged in a sloping way, for example along an upper limitation of a window having a sloping design, such as in a gable application. More specifically, the cover arrangement creates conditions for arranging the plate-shaped cover in any orientation without risking it to fall from its associated elongated support member in case of an undesirable release from its connected state.

According to one alternative to the above described embodiments, the elongated plate shaped cover may be connected to an elongated support member in a way that the longitudinal direction of the elongated plate shaped cover extends horizontally and the plate-shaped portion of the elongated plate shaped cover extends in a vertical plane. According to one example, the pivot means is arranged at a longitudinal edge of the elongated plate shaped cover facing upwards for engagement with a complimentary shaped pivot means of the elongated support member, wherein the elongated plate shaped cover would extend downwards, or in other words hang, from the elongated support member in the connected state. According to one alternative, the pivot means is arranged at a longitudinal edge of the elongated plate shaped cover facing downwards, wherein the elongated plate shaped cover would extend upwards, or in other words be standing up, from the elongated support member in the connected state.

Although the invention has been described above for a covering in the form of a sheet of fabric rolled on a roll, other types include a covering made up of several long horizontal or vertical slats of various types of hard material, including wood, plastic or metal which are held together by cords that run through the blind slats are conceivable.

Further, although the invention has been shown and described in association with a small, normal window, it may of course be used in larger applications, such as windows extending all the way between the floor and the ceiling, for bi-folding doors with multiple blinds, sliding doors with very wide blinds, gable windows etc.

The invention claimed is:

1. A cover arrangement for at least partially covering an opening, wherein the cover arrangement comprises an elongated support member, which is adapted to be arranged adjacent the opening in a recessed configuration in a groove in a wall or roof, wherein the cover arrangement comprises a plate-shaped cover adapted to be connected to the elongated support member in a way that, in a connected state, the plate-shaped cover projects from the elongated support member to at least partially covering the opening, wherein the elongated support member comprises a plate-shaped portion and the plate-shaped cover comprises a plate-shaped portion, and wherein the plate-shaped cover is adapted to be connected to the elongated support member in a way that, in the connected state, a main extension plane of the plate-shaped portion of the plate-shaped cover is substantially perpendicular in relation to a main extension plane of the plate-shaped portion of the elongated support member, and wherein the cover arrangement comprises at least one connection element, wherein the connection element and the elongated support member comprises complimentary shaped first engagement means so that the connection element may be rigidly connected to the elongated support member in an operative state, and wherein the connection element and the plate-shaped cover comprises complimentary shaped pivot means so that the plate-shaped cover may be pivoted between a non-connected state and the connected state in relation to the elongated support member when the connection element is in its operative state in relation to the elongated support member, wherein the pivot means of the connection element comprises a hook-shaped portion, which is adapted to form a pivot axis for the plate-shaped cover, wherein the pivot means of the plate-shaped cover comprises a hook-shaped portion at a free end of the plate-shaped cover and which hooked-shaped portion of the plate-shaped cover is adapted to engage with the hook-shaped portion of the connection element, wherein the connection element comprises a projection which has a curved shape defining a receptacle for an edge section of the plate-shaped cover during connection and disconnection, wherein the receptacle is defined by the projection in one direction and by the plate shaped portion of the elongated support member in another direction, wherein the receptacle is open for receiving the edge section of the plate-shaped cover during connection and disconnection and wherein the hook-shaped portion of the connection element is disposed at a free end of the projection, wherein the hook-shaped portion of the connection element extends into the receptacle.

2. A cover arrangement according to claim 1, wherein the plate-shaped cover and the elongated support member comprises complimentary shaped second engagement means for fixing the plate-shaped cover in the connected state in relation to the elongated support member.

3. A cover arrangement according to claim 1, wherein the connection element comprises a plurality of connection elements which are adapted to be connected to the elongated support member in a spaced relationship in a longitudinal direction of the elongated support member.

4. A cover arrangement according to claim 1, wherein at least one of the complimentary shaped first engagement means comprises an elastic portion adapted for being elastically displaced during engagement and disengagement.

5. A cover arrangement according to claim 1, wherein the connection element is arranged so that the pivot means is positioned at a distance from an adjacent surface of the elongated support member when the connection element is in its operative state in relation to the elongated support member so that the pivot means of the plate-shaped cover may enter into engagement with the pivot means of the connection element via the space between the pivot means of the connection element and the adjacent surface of the elongated support member.

6. A cover arrangement according to claim 1, wherein the cover arrangement is adapted to be connected to a wall portion or ceiling portion adjacent a window or other space for supporting a covering.

7. A cover arrangement according to claim 1, wherein the elongated support member has a profile defining a channel with a main extension direction in a longitudinal direction of the elongated support member, wherein the channel is open in one direction transverse of the longitudinal direction and wherein the plate-shaped cover is arranged to extend in a direction between opposite walls defining the channel in the connected state.

8. A connection element for connecting a plate-shaped cover to an elongated support member, wherein the connection element comprises a first engagement means for engagement with a complimentary shaped first engagement means of the elongated support member in a way that the connection element may be rigidly connected to the elongated support member in an operative state and a pivot means defining a pivot axis for the plate-shaped cover so that the plate-shaped cover, via engagement with a complimentary shaped pivot means of the plate-shaped cover, the pivot means of the plate shaped cover being formed as a hook-shaped portion at a free end of the plate-shaped cover, may be pivoted between a non-connected state and a connected state in relation to the elongated support member when the connection element is in its operative state in relation to the elongated support member, wherein the pivot means of the connection element comprises a hook-shaped portion, which is adapted to form a pivot axis for the plate-shaped cover, wherein the connection element comprises a projection which has a curved shape defining a receptacle for an edge section of the plate-shaped cover during connection and disconnection, wherein the receptacle is defined by the projection in one direction and by a plate shaped portion of the elongated support member in another direction when the connection element is in its operative state in relation to the elongated support member, wherein the receptacle is open for receiving the edge section of the plate-shaped cover during connection and disconnection and wherein the hook-shaped portion of the connection element is disposed at a free end of the projection, wherein the hook-shaped portion of the connection element extends into the receptacle.

9. A connection element according to claim 8, wherein the first engagement means comprises an elastic portion adapted for being elastically displaced during engagement and disengagement of the connection element in relation to the elongated support member.

10. A connection element according to claim 8, wherein a concave surface of the hook-shaped portion faces in the same direction as the first engagement means.

11. A connection element according to claim 8, wherein the connection element comprises a positioning portion adapted for engaging a complimentary shaped portion of the elongated support member for positioning the connection element relative to the elongated support member during engagement of the first engagement means.

12. A connection element according to claim 8, wherein the connection element is formed by a profile.

13. A connection element according to claim 8, wherein the connection element is a one-piece unit.

14. A connection element according to claim 8, wherein the connection element is formed in a non-metal material.

15. A connection element according to claim 8, wherein the connection element has an extension in an extension direction between 10-50 mm, which extension direction is adapted for being in parallel with a longitudinal direction of the elongated support member when the connection element is in its operative state.

* * * * *